(12) United States Patent
Daiku

(10) Patent No.: US 7,916,221 B2
(45) Date of Patent: Mar. 29, 2011

(54) SURFACE LIGHT SOURCE AND LIQUID CRYSTAL DISPLAY APPARATUS

(75) Inventor: Yasuhiro Daiku, Iruma (JP)

(73) Assignee: Casio Computer Co., Ltd., Tokyo (JP)

(*) Notice: Subject to any disclaimer, the term of this patent is extended or adjusted under 35 U.S.C. 154(b) by 1151 days.

(21) Appl. No.: 11/529,684

(22) Filed: Sep. 28, 2006

(65) Prior Publication Data

US 2007/0069978 A1    Mar. 29, 2007

(30) Foreign Application Priority Data

Sep. 29, 2005 (JP) ................................. 2005-283521

(51) Int. Cl.
*G02F 1/1335* (2006.01)
(52) U.S. Cl. ......................................................... 349/15
(58) Field of Classification Search .................. 349/15, 349/61, 68
See application file for complete search history.

(56) References Cited

U.S. PATENT DOCUMENTS

| | | | | | |
|---|---|---|---|---|---|
| 6,128,059 | A | * | 10/2000 | Nishiguchi | 349/129 |
| 7,333,158 | B2 | * | 2/2008 | Chien et al. | 349/15 |
| 2009/0310044 | A1 | * | 12/2009 | Lee | 349/15 |

FOREIGN PATENT DOCUMENTS

| | | |
|---|---|---|
| JP | 3-119889 A | 5/1991 |
| JP | 5-257083 A | 10/1993 |
| JP | 7-5455 A | 1/1995 |
| JP | 7-234459 A | 9/1995 |
| JP | 9-043540 A | 2/1997 |
| JP | 10-063199 A | 3/1998 |
| JP | 10-268230 A | 10/1998 |
| JP | 2002-148561 A | 5/2002 |
| JP | 2004-101714 A | 4/2004 |
| JP | 2004-212648 A | 7/2004 |
| JP | 2004-233462 A | 8/2004 |
| JP | 2005-078824 A | 3/2005 |

OTHER PUBLICATIONS

Japanese Office Action dated Aug. 4, 2009, and English translation thereof issued in a counterpart Japanese Application No. 2005-283521.

Japanese Office Action dated Mar. 2, 2010 and English translation thereof in counterpart Japanese Application No. 2005-283521.

* cited by examiner

*Primary Examiner* — David Nelms
*Assistant Examiner* — Nathanael R Briggs
(74) *Attorney, Agent, or Firm* — Holtz, Holtz, Goodman & Chick, PC

(57) ABSTRACT

A surface light source includes a light guide unit which allows two linear polarized lights having polarized planes perpendicular to each other to alternately exit from an exit surface in a direction substantially parallel with a normal line of the exit surface. A retardation element is arranged to face the exit surface. The retardation element has $\lambda/2$ retardation portions which give a phase difference of a ½ wavelength between ordinary light and abnormal light, and a plurality of non-retardation portions having substantially no phase difference alternately formed in a direction along the exit surface. A lens array is provided to face the light guide unit. The lens array allows light which has been transmitted through a $\lambda/2$ retardation portion to exit in a first inclined exiting direction, and allows light which has been transmitted through a non-retardation portion to exit in a second inclined exiting direction.

5 Claims, 10 Drawing Sheets

SURFACE LIGHT SOURCE AND LIQUID CRYSTAL DISPLAY APPARATUS

CROSS-REFERENCE TO RELATED APPLICATIONS

This application is based upon and claims the benefit of priority from prior Japanese Patent Application No. 2005-283521, filed Sep. 29, 2005, the entire contents of which are incorporated herein by reference.

BACKGROUND OF THE INVENTION

1. Field of the Invention

The present invention relates to a surface light source which is used to display a stereoscopic three-dimensional image in a liquid crystal display apparatus and the liquid crystal display apparatus which displays the three-dimensional image.

2. Description of the Related Art

A conventional liquid crystal display apparatus which displays a three-dimensional image displays an image for a left eye by using each pixel in every other pixel column in a plurality of pixel columns along a vertical direction of a screen and displays an image for a right eye by using each pixel in remaining every other pixel column in a liquid crystal display panel. There is an apparatus which enables the image for the left eye and the image for the right eye to be observed by a left eye and a right eye of an observer through a lenticular lens which distributes these images to a left-eye direction and a right-eye direction of the display observer or a parallax barrier in which a plurality of transmitting portions and light shielding portions parallel with the pixel columns are alternately aligned to be formed into a stripe pattern (see Jpn. Pat. Appln. KOKAI Publication No. 119889-1991, Jpn. Pat. Appln. KOKAI Publication No. 005455-1995 and Jpn. Pat. Appln. KOKAI Publication No. 268230-1998).

In the above-described three-dimensional image display apparatus, a relative position of each pixel column and the lenticular lens or the parallax lens must be accurately set, and hence manufacture of the device is difficult. Further, since one pixel is constituted by using every other pixel column, there is a problem of a low resolution.

BRIEF SUMMARY OF THE INVENTION

It is an object of the present invention to provide a light source which can distribute light from the light source to a left-eye direction and a right-eye direction, and a liquid crystal display apparatus which displays a three-dimensional image using this light source. Furthermore, it is another object of the present invention to provide a liquid crystal display apparatus capable of displaying a three-dimensional image with a high resolution.

According to a first aspect of the present invention, there is provided a surface light source comprising:

a light guide unit which has an exit surface and allows two linear polarized lights having polarized planes perpendicular to each other to alternately exit from the exit surface in a direction substantially parallel with a normal line of the exit surface;

a retardation element which is arranged to face the exit surface of the light guide unit, the retardation element having a plurality of $\lambda/2$ retardation portions which give a phase difference of a ½ wavelength between ordinary light and abnormal light of transmitted, and a plurality of non-retardation portions having substantially no phase difference alternately formed in a direction along the exit surface of the light guide unit; and a lens array which is provided on an opposite side of the side of the retardation element facing the light guide unit, the lens array having a plurality of lenses each corresponding to each pair of one $\lambda/2$ retardation portion and one non-retardation portion adjacent to each other in the retardation element, each lens of the lens array allowing light which has exited from the exit surface of the light guide unit and has been transmitted through the $\lambda/2$ retardation portion in each of a plurality of regions of the retardation element to exit in a first exiting direction inclined in one direction with respect to a predetermined direction, and allowing light which has been transmitted through the non-retardation portion in each of a plurality of regions to exit in a second exiting direction inclined in an opposite direction of the one direction with respect to the predetermined direction.

In this surface light source, it is desirable that the light guide unit is constituted of: a light guide plate which has an incidence portion from which light enters, the exit surface from which light which has entered from the incidence portion exits and a reflection surface which reflects light which has entered from the incidence portion toward the exit surface, and guides light which has entered from the incidence portion to exit from the exit surface; first and second light emitters which are arranged to face the incidence portion of the light guide plate and selectively turned on; and first and second linear polarizing elements which are arranged in such a manner that their transmission axes become substantially perpendicular to each other on exit sides of the first and second light emitters. Moreover, it is preferable that the light guide unit is constituted of two incidence end surfaces formed of two opposed end surfaces of a transparent plate having a rectangular planar shape, an exit surface formed on one of two plate surfaces, and a reflection surface which is provided on the other plate surface facing the exit surface and reflects light which has entered from the incidence end surfaces toward the exit surface, and that the first and second linear polarizing elements are constituted of polarizing plates arranged to face the respective incidence end surfaces between the two incidence end surfaces of the light guide plate and the first and second light emitters. Additionally, it is desirable that the light guide unit is constituted of: a prism sheet which has a plurality of elongated prisms formed in parallel on one surface thereof and allows light to exist from the other surface in a direction substantially parallel with a direction of a normal line of this surface; a reflection plate which is arranged to face the prism sheet with a space interposed therebetween; first and second light emitters which are respectively arranged at two opposed end portions in a direction perpendicular to a length direction of the elongated prisms and emit light toward the space formed between the prism sheet and the reflection plate; and first and second linear polarizing elements which are respectively arranged on light-emitting surfaces of the first and second light emitters in such a manner that their transmission axes become substantially perpendicular to each other. Alternatively, the light guide unit may be constituted of: a light guide plate which has an incidence end surface from which light enters formed on an end surface of a transparent plate, a flat exit surface from which light which has entered from the incidence end surface exits formed on one of two plate surfaces of the transparent plate and a reflection surface which reflects the light which has entered from the incidence end surface toward the exit surface formed on the other plate surface of the transparent plate; a plurality of first and second light emitters which are alternately aligned and arranged in a length direction of the incidence end surface to face the incidence end surface on one end surface of the light guide plate; and a plurality of first and second linear polarizing elements which are arranged on exit sides of the first and second light emitters in accordance with the respective light emitters in such a manner that their transmission axes become substantially perpendicular to each other. In this case, it is desirable that the light guide unit further includes a diffusion plate arranged between the incidence end surface of the light guide plate and the plurality of first and second linear polarizing elements.

In the surface light source according to the present invention, it is desirable that a retardation element has a configuration in which a plurality of elongated λ/2 retardation portions and a plurality of non-retardation portions having substantially the same width are alternately arranged in stripe patterns, and that the lens array is constituted of a plurality of substantially semicircular cylindrical lenses each of which has a diameter corresponding to a total width of the non-retardation portion and the λ/2 retardation portion adjacent thereto.

According to a second aspect of the present invention, there is provided a liquid crystal display apparatus comprising:

a liquid crystal display panel which includes two polarizing plates respectively arranged on an observation side and its opposite side, the liquid crystal display panel having a screen area in which a plurality of pixels for controlling transmission of light are arranged in a matrix form, wherein data is written in the plurality of pixels to thereby display an image corresponding to the image data; and a surface light source including a light guide unit, a retardation element, and a lens array wherein the light guide unit includes an exit surface and allows two linear polarized lights having polarized planes perpendicular to each other to alternately exit from the exit surface in a direction substantially parallel with a normal line of the exit surface, wherein the retardation element is arranged to face the exit surface of the light guide unit, and has a plurality of λ/2 retardation portions which give a phase difference of a ½ wavelength between normal line and abnormal light of transmitted light and a plurality of non-retardation portions having substantially no phase difference alternately formed in a direction along the exit surface of the light guide unit, and wherein the lens array is provided on an opposite side of a side of the retardation element facing the light guide unit, the lens array including a plurality of lenses each corresponding to each pair of one λ/2 retardation portion and one non-retardation portion adjacent to each other of the retardation element, and allowing light which has exited from the exit surface of the light guide unit and has been transmitted through the λ/2 retardation portions in a plurality of regions of the retardation element to exit in a first exiting direction inclined to one direction with respect to a predetermined direction, the lens array allowing light which has been transmitted through the non-retardation portions in said plurality of regions to exit in a second exiting direction inclined to an opposite direction of the one direction with respect to the predetermined direction.

In the liquid crystal display apparatus according to the present invention, it is preferable that the surface light source is formed of a light source device or element which allows linear polarized light substantially parallel with a transmission axis of a polarizing plate on an opposite side of the liquid crystal display panel to selectively exit in a first exiting direction facing a direction inclined toward a left-eye direction of an observer with respect to a normal line direction of the liquid crystal display panel and a second exiting direction facing a direction inclined toward a right-eye direction of the observer with respect to the normal line, and that the liquid crystal display apparatus further comprises a control device which alternately writes left-eye image data and right-eye image data which are required to display a three-dimensional image in a plurality of pixels in the liquid crystal display panel and selects the first exiting direction and the second exiting direction of the light source device in synchronization with a left-eye image and display of the left-eye image.

In this liquid crystal display apparatus, it is preferable that the light guide unit comprises: a light guide plate which has an incidence portion from which light enters, an exit surface from which the light which has entered from the incidence portion exits and a reflection surface which reflects the light which has entered from the incidence portion toward the exit surface, and guides the light which has entered from the incidence portion to exit from the exit surface; first and second light emitters which are arranged to face the incidence portion of the light guide plate and selectively turned on; and first and second linear polarizing elements which are respectively arranged on exit sides of the first and second light emitters in such a manner that their transmission axes become substantially perpendicular to each other, and that the control device comprises a drive circuit which alternately writes left-eye image data and right-eye image data required to display a three-dimensional image in a plurality of pixels in the liquid crystal display panel, turns on one of the first and second light emitters of the surface light source in synchronization with display of a left-eye image and turns on the other light emitter of the surface light source in synchronization with display of the left-eye image. Additionally, it is preferable that the light guide unit is constituted of: two incidence end surfaces formed of opposed end surfaces of a transparent plate having a rectangular planar shape; an exit surface formed on one of two plate surfaces; and a reflection surface which is formed of the other plate surface facing this exit surface and reflects light which has entered from the incidence end surfaces toward the exit surface, and that the first and second linear polarizing elements are formed of polarizing plates which are arranged to face the respective incidence end surfaces between the two incidence end surfaces of the light guide plate and the first and second light emitters.

In this liquid crystal display apparatus, it is preferable that the retardation element has a configuration in which a plurality of elongated λ/2 retardation portion and a plurality of non-retardation portion having substantially the same width are alternately arranged in a stripe pattern, and that the lens array is constituted of a plurality of substantially semicircular cylindrical lenses each of which has a diameter of corresponding to a sum width of the non-retardation portion and the λ/2 retardation portion adjacent thereto. It is more preferable that the lens array is constituted of cylindrical lenses each having a semicircular cross section whose center is placed on each boundary surface of the plurality of λ/2 retardation portions and the plurality of non-retardation portions of the retardation element.

Further, in this liquid crystal display apparatus, the light guide unit may comprise: a prism sheet having a plurality of elongated prisms formed in parallel on one surface and allows light to exit from the other surface in a direction substantially parallel with a normal line direction of this surface; a reflection plate which is arranged to face the prism sheet with a space provided therebetween; first and second light emitters which are respectively arranged at two opposed end portions in a direction perpendicular to a length direction of the elongated prisms and emit light toward the space formed between the prism sheet and the reflection plate; and first and second linear polarizing elements which are arranged on light-emitting surfaces of the first and second light emitters in such a manner that their transmission axes become substantially perpendicular to each other. Alternatively, the light guide unit may comprise: a light guide plate which is formed of an incidence end surface from which light enters formed on one end surface of a transparent plate, a flat exit surface from which light which has entered from the incidence end surface exits and which is formed on one of two plate surfaces of the transparent plate and a reflection surface which reflects light which has entered from the incidence end surface toward the exit surface and is formed on the other plate surface of the transparent plate; a plurality of first and second light emitters which are alternately aligned and arranged in a length direction of the incidence end surface to face the incidence end surface on the one end surface of the light guide plate; and a plurality of first and second linear polarizing elements which are arranged on exit sides of the first and second light emitters in accordance with the respective light emitters in such a manner that their transmission axes become substantially perpendicular to each other.

According to a third aspect of the present invention, there is provided a liquid crystal display apparatus comprising:

a liquid crystal display panel which has two polarizing plates arranged on an observation side and its opposite side, the liquid crystal display panel having a screen area in which a plurality of pixels which control transmission of light are arranged in a column and row directions of a matrix form, wherein image data is written in the plurality of pixels to thereby display an image corresponding to the image data;

a surface light source element which is arranged on the opposite side of the liquid crystal display panel, and selectively emits first illumination light of linear polarized light substantially perpendicular to a transmission axis of the opposite-side polarizing plate of the liquid crystal display panel and second illumination light of linear polarized light substantially parallel with the transmission axis of the opposite-side polarizing plate;

a retardation element which is arranged between the light source element and the liquid crystal display panel, the retardation element having a plurality of $\lambda/2$ retardation portions which give a phase difference of a ½ wavelength between ordinary light and abnormal light of transmitted light formed in accordance with one group of every other pixel column, and a plurality of non-retardation portions having substantially no phase difference formed in accordance with the other group of every other pixel column, wherein the retardation element allows light which has been transmitted through the plurality of $\lambda/2$ retardation portions and travels toward the one group to exit toward a direction of one of left and right eyes of an observer, allows light which has been transmitted through the plurality of $\lambda/2$ retardation portions and travels toward the other group to exit toward a direction of the other eye of the observer, allows light which has been transmitted through the plurality of non-retardation portions and travels toward the one group to exit toward the direction of the other eye, and allows light which has been transmitted through the plurality of non-retardation portions and travels toward the other group to exit toward the direction of the one eye, the screen area of the liquid crystal panel being divided into the groups of a predetermined number, which is one or more, of pixel columns in a lateral direction of the screen; and a control device which alternately writes right-eye and left-eye image data required to display a three-dimensional image in respective pixel columns corresponding to the one group of every other pixel column and respective pixel columns corresponding to the other group of every other pixel column, wherein the control device allows the light source element to emit the first illumination light in synchronization with the images, alternately writes left-eye image data and right-eye image data in respective pixel columns corresponding to the one group of every other pixel column and respective pixel columns corresponding to the other group of every other pixel column, and allows the light source to emit the second illumination light in synchronization with display of the images.

In this liquid crystal display apparatus, it is preferable that the retardation element comprises: a plurality of $\lambda/2$ retardation portions which are respectively provided in accordance with every other pixel column in a plurality of pixel columns of the liquid crystal display panel and give a phase difference of a ½ wavelength between ordinary light and abnormal light of transmitted light; and a plurality of non-retardation portions which are respectively provided in accordance with the other group of every other pixel column and have substantially no phase difference, and the retardation element is arranged in such a manner that light which has been transmitted through the plurality of $\lambda/2$ retardation portions to travel toward one group of even-numbered pixel columns or odd-numbered pixel columns in the pixel columns is allowed to exit toward a direction of one of left and right eyes of an observer, light which has been transmitted through the plurality of $\lambda/2$ retardation portions to travel toward the other pixel columns is allowed to exit toward a direction of the other of the left and right eyes of the observer, light which has been transmitted through the plurality of non-retardation portions to travel toward the one group of the pixel columns is allowed to exit toward the direction of the other eye, and light which has been transmitted through the plurality of non-retardation portions to travel toward the other group of the pixel rows is allowed to exit toward the direction of the one eye.

Furthermore, it is preferable that the control device alternately writes left-eye image data and right-eye image data in respective pixel columns corresponding to odd-numbered rows and respective pixel columns corresponding to even-numbered rows in the liquid crystal display panel in a first display period, and alternately writes the right-eye image data and the left-eye image data in the respective pixel columns corresponding to the even-numbered rows and the respective pixel columns corresponding to the odd-numbered rows in a second display period following the first display period.

Moreover, in this liquid crystal display apparatus, it is also preferable that a light guide unit is provided which comprises: a light guide plate which has an incidence portion from which light enters, an exit surface from which light which has entered from the incidence portion exits and a reflection surface which reflects light which has entered from the incidence portion toward the exit surface, and guides the light which has entered from the incidence portion to exit from the exit surface; first and second light emitters which are arranged to face the incidence portion of the light guide plate and selectively turned on; and first and second linear polarizing elements which are respectively arranged on exit sides of the first and second light emitters in such a manner that their transmission axes become substantially perpendicular to each other. Additionally, it is desirable that the light guide unit is constituted of: two incidence end surfaces formed of opposed end surfaces of a transparent plate having a rectangular planar shape; an exit surface formed on one of two plate surfaces; and a reflection surface which is formed of the other plate surface facing this exit surface and reflects light which has entered from the incidence end surfaces toward the exit surface, and that the first and second linear polarizing elements are constituted of polarizing plates which are arranged to face the respective incidence end surfaces between the two incidence end surfaces of the light guide plate and the first and second light emitters.

In the surface light source based on the first aspect according to the present invention are arranged: the light guide unit which allows two linear polarized lights having polarization planes perpendicular to each other to exit in a direction substantially parallel with a normal line of its exit surface; the retardation element having the plurality of λ/2 retardation portions which give a phase difference of a ½ wavelength and the plurality of non-retardation portions having substantially no phase difference alternately formed on a front surface thereof; and the prism sheet on which one λ/2 retardation portion and one non-retardation portion of the retardation portion adjacent to each other is determined as one pair and the plurality of lens each of which corresponds to each pair are arranged. Therefore, two linear polarized lights whose polarization planes are perpendicular to each other are allowed to exit with strong directivity in a direction inclined in one direction with respect to a predetermined direction and a direction inclined in an opposite direction, thereby obtaining the surface light source suitable for a light source required to display a three-dimensional image.

Additionally, in the liquid crystal display apparatus based on the second aspect according to the present invention, since the liquid crystal display panel capable of alternately displaying a left-eye image and a right-eye image of a three-dimensional image is further arranged in front of the surface light source, all pixels in the liquid crystal panel can be used to alternately display the left-eye image and the right-eye image, thereby displaying a high-quality three-dimensional image having high resolutions of both the left-eye image and the right-eye image.

Further, according to this liquid crystal display apparatus, directional light having a peak of an exiting light intensity existing in the right-eye direction and a spread angle in a predetermined angle range can exit from the surface light source, thereby displaying a three-dimensional image having high luminance of both the left-eye image and the right-eye image, high contrast and a higher quality.

According to the liquid crystal display apparatus based on the third aspect of the present invention, since the plurality of λ/2 retardation portions and non-retardation portions of the retardation element function as parallax barriers or slits through which light is transmitted by irradiation of first and second illumination lights, a left-eye image displayed by the odd-numbered pixel columns, a right-eye image displayed by the even-numbered pixel columns, a left-eye image displayed by the even-numbered pixel columns and a right-eye image displayed by the odd-numbered pixel columns can be observed in first and second consecutive display periods. Therefore, all the pixels in the liquid crystal display panel are used to alternately display the left-eye image and the right-eye image, thereby display a high-quality three-dimensional image with high resolutions of both the left-eye image and the right-eye image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A and 3B are views for illustrating exiting light when displaying a left-eye image and when displaying a right-eye image in the liquid crystal display apparatus depicted in FIG. 1, in which FIG. 3A shows an exiting light ray when displaying the right-eye image and FIG. 3B shows an exiting light ray when displaying the left-eye image;

FIG. 4 is a view for illustrating an exiting light from a surface light source of the liquid crystal display apparatus when a first light emitter is turned on;

FIG. 5 is a view for illustrating an exiting light from the surface light source of the liquid crystal display apparatus when a second light emitter is turned on;

FIG. 6 is an exiting light intensity distribution chart of linear polarized lights in two directions from the surface light source when the first light emitter is turned on;

FIG. 7 is an exiting light intensity distribution chart of linear polarized lights in two directions from the surface light source when the second light emitter is turned on;

DETAILED DESCRIPTION OF THE INVENTION

First Embodiment

Figure 1:
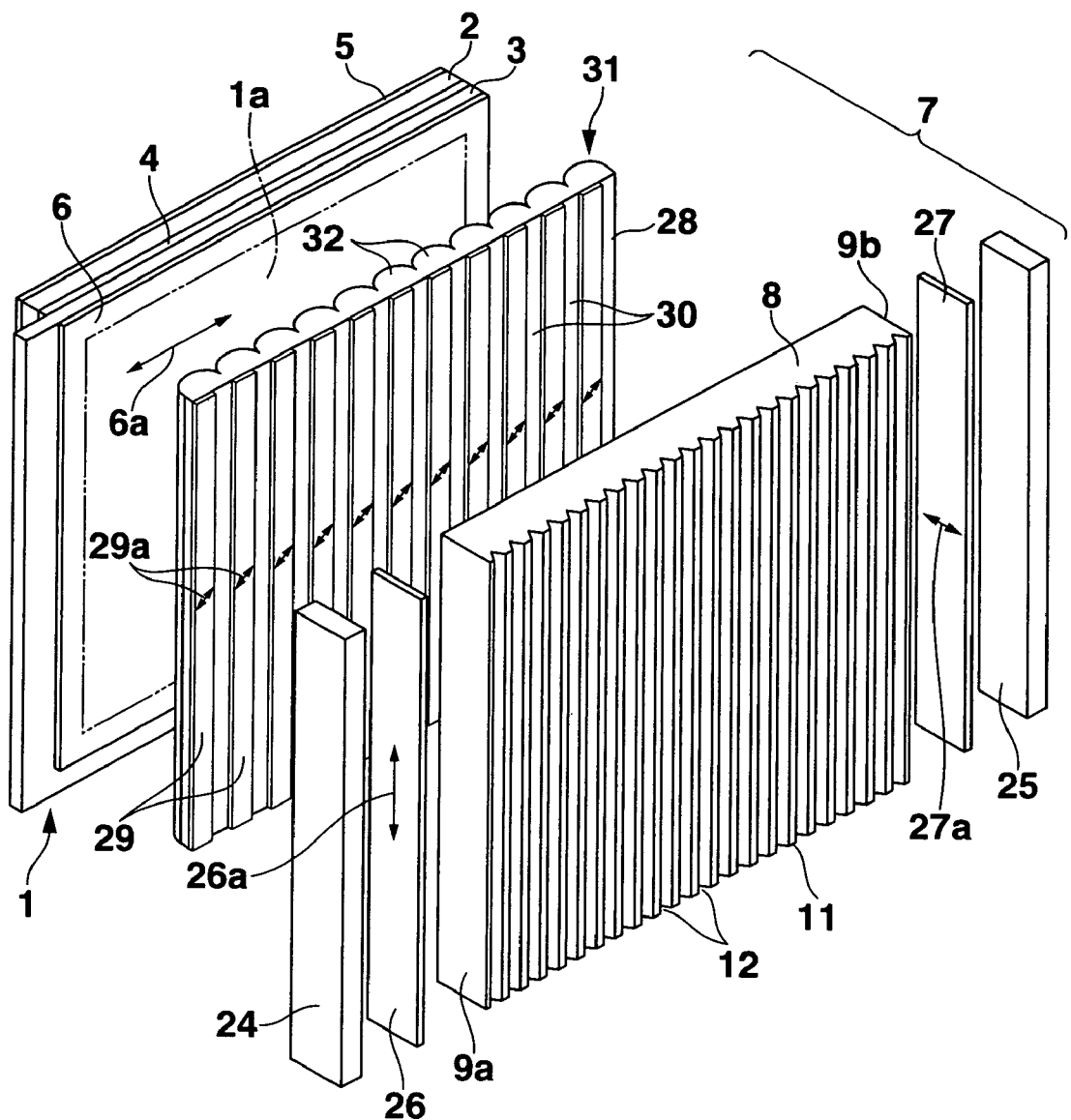
FIG. 1 is a schematic exploded perspective view of a liquid crystal display apparatus showing a first embodiment of the present invention.
Figure 2:
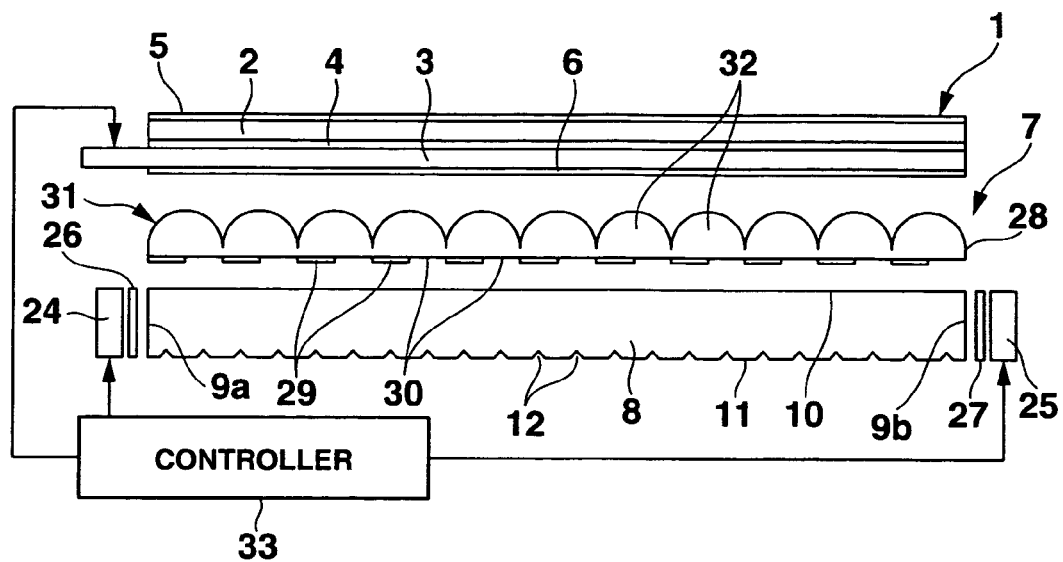
FIG. 2 is a schematic plan view of the liquid crystal display apparatus depicted in FIG. 1.

FIGS. 1 to 7 show a first embodiment according to the present invention, wherein FIG. 1 is an exploded perspective view of a liquid crystal display apparatus, and FIG. 2 is a plan view of the liquid crystal display apparatus.

As shown in FIGS. 1 and 2, this liquid crystal display apparatus is constituted of a liquid crystal display panel 1, a surface light source 7 arranged on an opposite side of an observation side of the liquid crystal display panel, and a controller 33 of the liquid crystal display panel 1 and the surface light source 7. The liquid crystal display panel 1 has polarizing plates 5 and 6 arranged on the observation side (an upper side in FIG. 2) and the opposite side. The panel 1 has a screen area 1a in which a plurality of pixels (not shown) which control transmission of light are arranged along row and column directions in a matrix form. The panel 1 displays an image corresponding to image data written in the plurality of pixels.

The liquid crystal display panel 1 is an active matrix liquid crystal display panel and its internal structure is not shown. The panel is constituted of a pair of transparent substrates 2 and 3 bonded to each other through a frame-like sealing material 4 and a liquid crystal layer inserted in a region surrounded by the sealing material 4 between the pair of substrates 2 and 3. A plurality of transparent pixel electrodes are arranged and formed in a row direction (a lateral direction in a screen) and a column direction (a vertical direction in the screen) in a matrix form. A plurality of TFTs (thin film transistors) are respectively connected with these pixel electrodes. A plurality of gate wiring lines which supply gate signals to the TFTs in each row, and a plurality of data wiring lines which supply image data signals to the TFTs in each column are provided on one of opposed inner surfaces of the pair of transparent substrates 2 and 3, e.g., an inner surface of the substrate 3 on the opposite side of the observation side. A single film-like transparent opposed electrode facing the plurality of pixel electrodes is provided on an inner surface of the other substrate (the substrate on the observation side) 2.

This liquid crystal display panel 1 is of a TN type in which liquid crystal molecules in the liquid crystal layer are twisted and aligned with a twist angle which is substantially 90° between the pair of substrates 2 and 3. Its observation-side polarizing plate 5 and opposite-side polarizing plate 6 are arranged in such a manner that their transmission axes 5a and 6a become perpendicular or parallel to each other.

The surface light source 7 is provided with a light guide unit or a light guide plate 8, first and second light emitters 24 and 25, first and second linear polarizing elements 26 and 27, a retardation element 28, and a lens array 31. The lens array 31 is provided on an opposite side of a side of the retardation element 28 facing the light guide unit 8. The light guide unit 8 has incidence portions 9a and 9b to which light enters, an exit surface 10 from which the light which has entered from the incidence portions 9a and 9b exits and a reflection surface 11. The reflection surface reflects the light which has entered from the incidence portions 9a and 9b toward the exit surface 10. Thus, the light guide unit 8 guides the light which has entered from the incidence portions 9a and 9b to exit from the exit surface 10. The first and second light emitters 24 and 25 are respectively arranged to face the incidence portions 9a and 9b of the light guide unit 8 and selectively turned on. The first and second linear polarizing elements 26 and 27 are arranged on the exit sides of the first and second light emitters 24 and 25 in such a manner that their transmission axes 26a and 27a become substantially perpendicular to each other as shown by arrows. The retardation element 28 is arranged to face the exit surface 10 of the light guide unit 8.

In more detail, the light guide unit 8 is constituted of a transparent plate such as an acrylic resin plate having a rectangular planar shape corresponding to the rectangular screen area 1a of the liquid crystal display panel 1. The incidence portions 9a and 9b are respectively formed on two opposed end surfaces of the light guide unit 8. The exit surface 10 is formed on one of two plate surfaces of the light guide unit 8. Further, the reflection surface 11 which reflects the light which has entered from the incidence portions 9a and 9b toward the exit surface 10 is formed on the other plate surface of the light guide unit 8. This light guide unit 8 will be referred to as a light guide plate, and its incidence portions 9a and 9b will be referred to as incidence end surfaces hereinafter.

The exit surface 10 of this light guide plate 8 is formed into a flat surface, and a plurality of linear elongated grooves 12 substantially parallel with a length direction of the incidence end surfaces 9a and 9b, i.e., a width direction of the light guide plate 8 are formed in the reflection surface 11 in a length direction of the light guide plate 8 at a fixed pitch.

The light guide plate 8 guides light which has entered from the incidence end surfaces 9a and 9b to a length direction of the light guide plate 8 while internally reflecting it by flat surface portions between the respective elongated grooves 12 of the reflection surface 11 and the exit surface 10, and internally reflects the light which has entered the respective elongated grooves 12 of the reflection surface 11 by groove surfaces of the elongated grooves 12 in a direction along which an angle with respect to a normal line direction of the exit surface 10 becomes small so that the light exits from the exit surface 10.

Each elongated groove 12 in the reflection surface 11 of this light guide plate 8 is formed to have an isosceles triangular cross section having two groove surfaces inclined at substantially 45° in a direction of one incidence end surface 9a and a direction of the other incidence end surface 9b with respect to the normal line direction of the exit surface 10. Each elongated groove 12 internally reflects light which has entered from the one incidence end surface 9a of the light guide plate 8 toward a direction close to the normal line of the exit surface 10 by the groove surface on the one incidence end surface 9a side, and internally reflects light which has entered from the other incidence end surface 9b of the light guide plate 8 toward a direction close to the normal line of the exit surface 10 by the groove surface on the other incidence end surface 9b side.

According to this structure, each light which enters the light guide plate 8 from the one incidence end surface 9a and the other incidence end surface 9b and exits from the exit surface 10 of the light guide plate 8 becomes light having directivity in which a peak of an exiting light intensity exists in the normal line direction of the exit surface 10.

Although the elongated grooves 12 in the reflection surface 11 of the light guide plate 8 are exaggeratingly illustrated in the figures, the elongated grooves 12 are formed at a pitch which is equal to or smaller than a pixel pitch of the liquid crystal display panel 1. Therefore, the light exiting from the exit surface 10 of the light guide plate 8 is light having a uniform intensity distribution without irregularities in intensity.

Each of the first and second light emitters 24 and 25 is formed of an light-emitting element array in which a plurality of solid light-emitting elements such as LEDs (light-emitting diodes) are arranged. Also, both light emitters 24 and 25 are arranged in such a manner that its exit surface faces the one incidence end surface 9a and the other incidence end surface 9b of the light guide plate 8 through the first and second linear polarizing element 26 or 27, respectively.

The opposed surfaces of the first and second linear polarizing elements 26 and 27 are formed into shapes corresponding to the incidence end surfaces 9a and 9b of the light guide plate 8. The elements 26 and 27 are respectively arranged between the one incidence end surface 9a of the light guide plate 8 and the first light emitter 24 arranged on the outer side thereof and between the other incidence end surface 9b of the light guide plate 8 and the second light emitter 25 arranged on the outer side thereof. The linear polarizing elements 26 and 27 are set in such a manner that transmission axes 26a and 26b thereof become substantially perpendicular to each other.

In this embodiment, as shown in FIG. 1, the first linear polarizing element 26 is arranged in such a manner that its transmission axis 26a becomes substantially parallel with the width direction (the length direction of the incidence end surfaces 9a and 9b) of the light guide plate 8, and the second linear polarizing element 27 is arranged in such a manner that its transmission axis 27a become substantially parallel with a board thickness direction (a height direction of the incidence end surfaces 9a and 9b) of the light guide plate 8.

The retardation element 28 arranged to face the exit surface 10 of the light guide plate 8 has a configuration in which a plurality of $\lambda/2$ retardation portions 29 which give a phase difference of a ½ wavelength between ordinary light and abnormal light of transmitted light and a plurality of non-retardation portions 30 having substantially no phase difference are alternately formed in the length direction along the exit surface 10 of the light guide plate 8. As shown in FIG. 1, each of the plurality of $\lambda/2$ retardation portions 29 has a phase retardation or slow axis 29a in a direction which is inclined at substantially 45° with respect to the width direction (the length direction of the incidence end surfaces 9a and 9b) of the light guide plate 8.

That is, the slow axis 29a of each of the plurality of $\lambda/2$ retardation portions 29 crosses at an angle of substantially 45° the polarized planes of both linear polarized light which is transmitted through the first linear polarizing element 26 from the first light emitter 24 to enter the light guide plate 8 and exits from the exit surface 10 of the light guide plate 8 and linear polarized light which is transmitted through the second linear polarizing element 27 from the second light emitter 25 to enter the light guide plate 8 and exits from the exit surface 10 of the light guide plate 8.

The plurality of $\lambda/2$ retardation portions 29 and non-retardation portions 30 of this retardation element 28 have the same width and are formed into stripe patterns parallel with one direction along the exit surface 10 of the light guide plate 8, e.g., the width direction (the length direction of the incidence end surfaces 9a and 9b) of the light guide plate 8.

Although the $\lambda/2$ retardation portions 29 and the non-retardation portions 30 are exaggeratingly illustrated in the figures, the $\lambda/2$ retardation portions 29 and the non-retardation portions 30 have widths which are substantially equal to each other and formed with a pitch which is as small as the pixel arrangement pitch.

In the retardation element 28, elongated $\lambda/2$ retardation films each formed of a uniaxially drawn film are aligned and stuck in stripe patterns on one surface of a transparent sheet which does not substantially demonstrate birefringence with respect to transmitted light, or a polymer liquid crystal is applied to or printed on the surface of the transparent sheet to be arranged in stripe patterns and polymerized in such a manner that molecular long axes are aligned in one determined direction, thereby forming a plurality of $\lambda/2$ retardation layers. The plurality of $\lambda/2$ retardation portions 29 are formed of parts where these $\lambda/2$ retardation layers are formed, and the plurality non-retardation portions 30 are formed of parts where the $\lambda/2$ retardation layers are not formed on the transparent sheet or parts where the polymer liquid crystal are not aligned in the one direction.

The lens array 31 provided on the opposite side of side of the retardation element 28 facing the light guide plate 8 has a plurality of lenses 32 respectively corresponding to a plurality of regions each formed of one $\lambda/2$ retardation portion 29 and one non-retardation portion 30 of the retardation element 28 adjacent to each other. These lenses 32 are formed of a plurality of cylindrical lenses each of which has a center line on a boundary surface between the $\lambda/2$ retardation portion and the non-retardation portion, a diameter corresponding to a total width of the $\lambda/2$ retardation portion and the non-retardation portion adjacent thereto and a substantially semicircular cross section. Each lens 32 is formed into an elongated shape which is in parallel with a length direction of the $\lambda/2$ retardation portion 29 and the non-retardation portion 30 formed into the stripe pattern and has a width which is substantially equal to a total width of each $\lambda/2$ retardation portion 29 and each non-retardation portion 30 adjacent to each other.

In this embodiment, although the lens array 31 is integrally formed on the opposite surface of the surface of the retardation element 28 on which the $\lambda/2$ retardation portions 29 are formed, the lens array 31 manufactured separately from the retardation element 28 may be arranged to face the retardation element 28.

The plurality of lenses 32 of the lens array 31 allow light which has exited from the exit surface 10 of the light guide plate 8 and has been transmitted through the $\lambda/2$ retardation portions 29 in the plurality of regions of the retardation element 28 to exit in a first exiting direction inclined toward one direction with respect to a predetermined direction. The plurality of lenses 32 also allow light which has been transmitted through the non-retardation portions 30 in the plurality of regions to exit in a second exiting direction inclined toward an opposite direction of the one direction with respect to the predetermined direction.

In this embodiment, the predetermined direction is a normal line direction of the exit surface 10 of the light guide plate 8. Each of the plurality of lenses 32 of the lens array 31 is formed into a semicircular cylindrical convex lens which is in parallel with the normal line direction of the exit surface 10 and symmetrical with respect to a surface running through the boundary between the $\lambda/2$ retardation portion 29 and the non-retardation portion 30 in each of the plurality of regions.

The lens array 31 allows light which has been transmitted through the $\lambda/2$ retardation portions 29 in the plurality of regions of the retardation element 28 in lights which have exited in a direction substantially parallel with the normal line direction of the exit surface 10 from the exit surface 10 of the light guide plate 8 to exit as first directional light whose exiting light intensity peak exists in the first exiting direction inclined toward the opposite direction of the $\lambda/2$ retardation portion 29 side with respect to the normal line direction of the exit surface 10 of the light guide plate 8 and which has intensive directivity in a predetermined angle range. Further, it allows light which has been transmitted through the non-retardation portions 30 in the plurality of regions of the retardation element 28 to exit as second directional light whose exiting light intensity peak exists in the second exiting direction inclined toward the opposite direction of the non-retardation portion 30 side with respect to the normal line direction of the exit surface 10 and which has intensive directivity in a predetermined angle range.

Figure 3A:
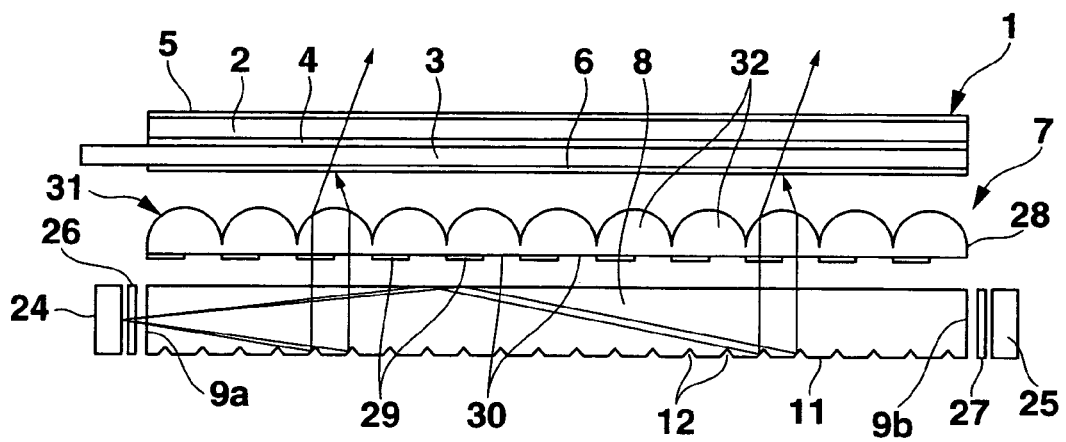
Figure 3B:
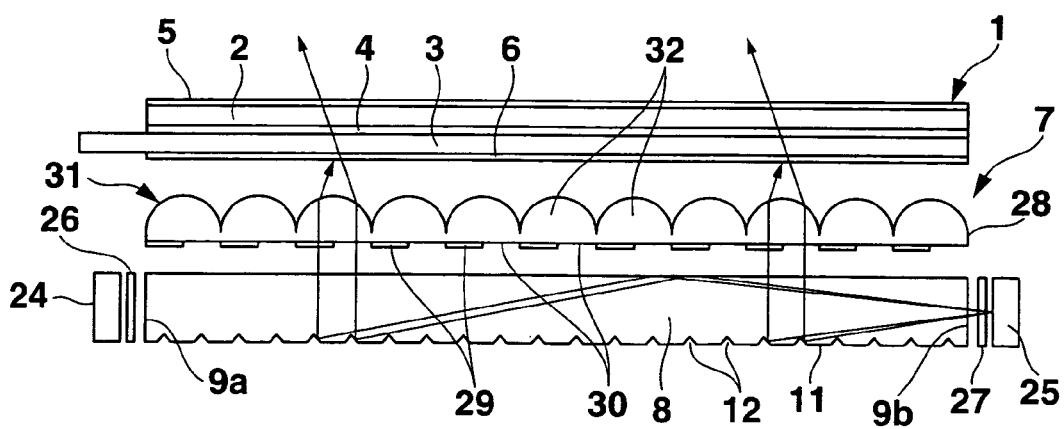

That is, the surface or plane light source 7 allows one of linear polarized lights in two directions substantially perpendicular to each other to exit in the first exiting direction and the other linear polarized light to exit in the second exiting direction by turning on one of the first and second light emitters 24 and 25, i.e., the light emitter 24 as shown in FIG. 3A, and allows the one linear polarized light to exit in the second exiting direction and the other linear polarized light to exit in the first exiting direction by turning on the other light emitter 25 as shown in FIG. 3B.

Figure 4:
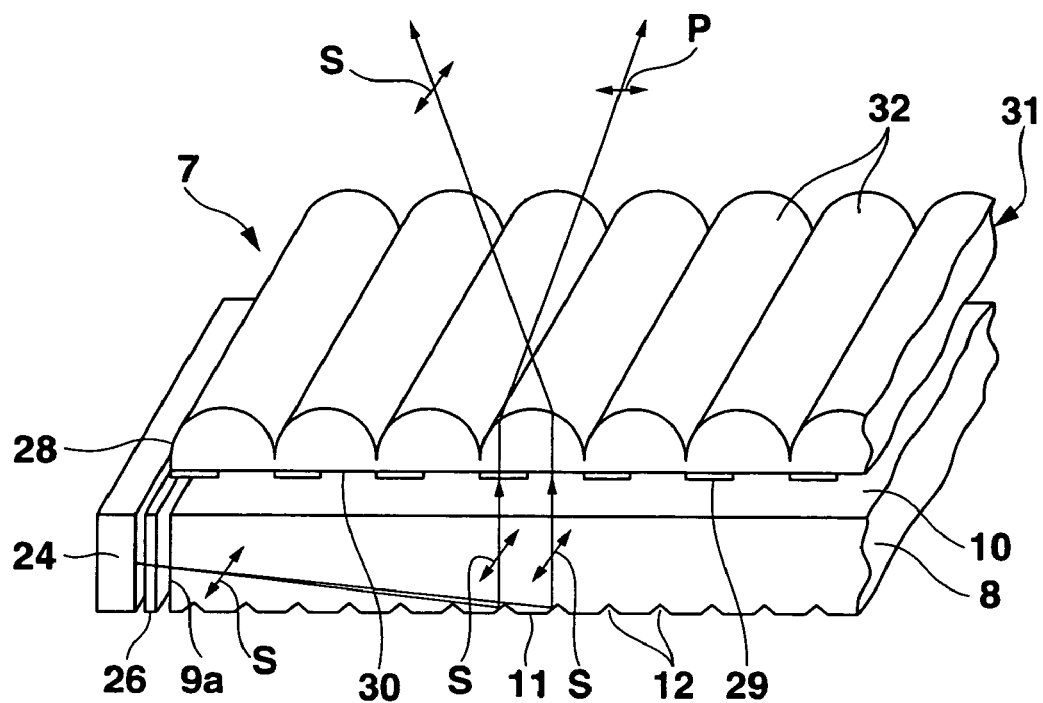
Figure 5:
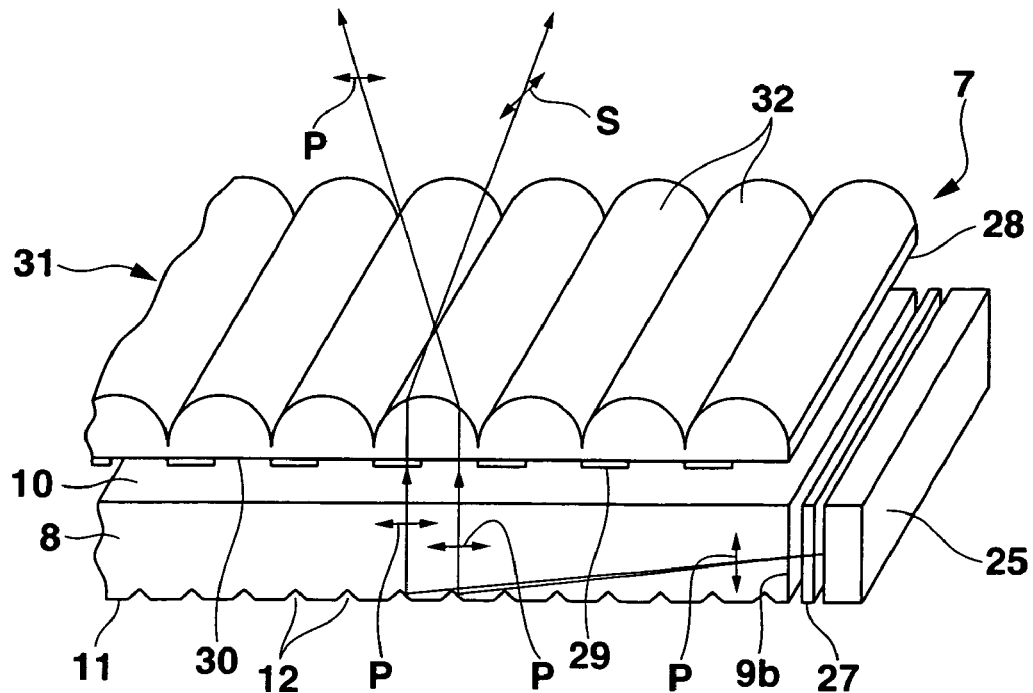

FIGS. 4 and 5 are views for illustrating exiting light from the surface light source 7, wherein FIG. 4 shows exiting light rays when the first light emitter 24 is turned on, and FIG. 5 shows exiting light rays when the second light emitter 25 is turned on.

As shown in FIG. 4, when the first light emitter 24 of the surface light source 7 is turned on, light from this first light emitter 24 is changed into linear polarized light S parallel with the transmission axis 26a by the first linear polarizing element 26. The light S enters the light guide plate 8 from its one incidence end surface 9a, is reflected by the groove surface of each elongated groove 12 of the reflection surface 11 of the light guide plate 8 on the one incidence end surface 9a side. Then the reflected light exits in a direction substantially parallel with the normal line of the exit surface 10 from the exit surface 10 of the light guide plate 8.

The linear polarized light S which has exited from the exit surface 10 of the light guide plate 8 enters the retardation element 28. Of this light, light which has entered the non-retardation portions 30 in the plurality of regions of the retardation element 28 is transmitted through the non-retardation portions 30 without substantially changing its polarized state and enters the lens array 31 as the linear polarized light S.

Further, of the light which has exited from the exit surface 10 of the light guide plate 8 and entered the retardation element 28, light which has entered the λ/2 retardation portions 29 in the plurality of regions of the retardation element 28 is transmitted through the λ/2 retardation portions 29 with its polarized plane being rotated 90° by each λ/2 retardation portion 29 having the phase retardation axis 29a in a direction of an angle which is substantially 45° with respect to the polarized plane, changed into linear polarized light P substantially perpendicular to the linear polarized light S transmitted through the non-retardation portion 30, and then enters the lens array 31.

Moreover, of the two linear polarized lights P and S having the polarized planes perpendicular to each other, the linear polarized light P from the λ/2 retardation portions 29 in the plurality of regions of the retardation element 28 is condensed by a part of each lens 32 in the lens array 31 corresponding to each λ/2 retardation portion 29, and exits in the first exiting direction inclined in the opposite direction of the λ/2 retardation portion 29 side with respect to the normal line direction of the exit surface 10 of the light guide plate 8. Additionally, the linear polarized light S from the non-retardation portions 30 in the plurality of regions of the retardation element 28 is condensed by a part of each lens 32 corresponding to each non-retardation portion 30, and exits in the second exiting direction inclined in the opposite direction of the non-retardation portion 30 side with respect to the normal line direction of the exit surface 10 of the light guide plate 8.

Further, as shown in FIG. 5, when the second light emitter 25 of the surface light source 7 is turned on, light from this second light emitter 25 is changed into the linear polarized light P parallel with the transmission axis 27a by the second linear polarizing element 27, enters the light guide plate 8 from the other incidence end surface 9b, and is reflected by the groove surface of each elongated groove 12 of the reflection surface 11 of the light guide plate 8 on the other incidence end surface 9b side. Then the reflected light exits in a direction substantially parallel with the normal line direction of the exit surface 10 from the exit surface 10 of the light guide plate 8.

Of the linear polarized light P which has exited from the exit surface 10 of the light guide plate 8 and entered the retardation element 28, light which has entered the non-retardation portions 30 in the plurality of regions of the retardation element 28 is transmitted through the non-retardation portions 30 without substantially changing its polarized state, and enters the lens array 31 as the linear polarized light P.

Furthermore, of the linear polarized light P which has entered the retardation element 28, light which has entered the λ/2 retardation portions 29 in the plurality of regions of the retardation element 28 is transmitted through the λ/2 retardation portions 29 with its polarized plane being rotated 90° by each λ/2 retardation portion 29 having the slow axis 29a in a direction of an angle of substantially 45° with respect to the polarized plane, to be changed into the linear polarized light S substantially perpendicular to the linear polarized light P transmitted through the non-retardation portions 30, and enters the lens array 31.

Moreover, of the two linear polarized lights P and S whose polarized planes are perpendicular to each other, the linear polarized light P from the non-retardation portions 30 in the plurality of regions of the retardation element 28 is condensed by a part of each lens 32 in the lens array 31 corresponding to the non-retardation portion 30, and exits in the second exiting direction inclined in the opposite direction of the non-retardation portion 30 side with respect to the normal line direction of the exit surface 10 of the light guide plate 8. Additionally, the linear polarized light S from the λ/2 retardation portions 29 in the plurality of regions of the retardation element 28 is condensed by a part of each lens 32 in the lens array 31 corresponding to the λ/2 retardation portion 29, and exits in the first exiting direction inclined in the opposite direction of the λ/2 retardation portion 29 side with respect to the normal line direction of the exit surface 10 of the light guide plate 8.

Figure 6:
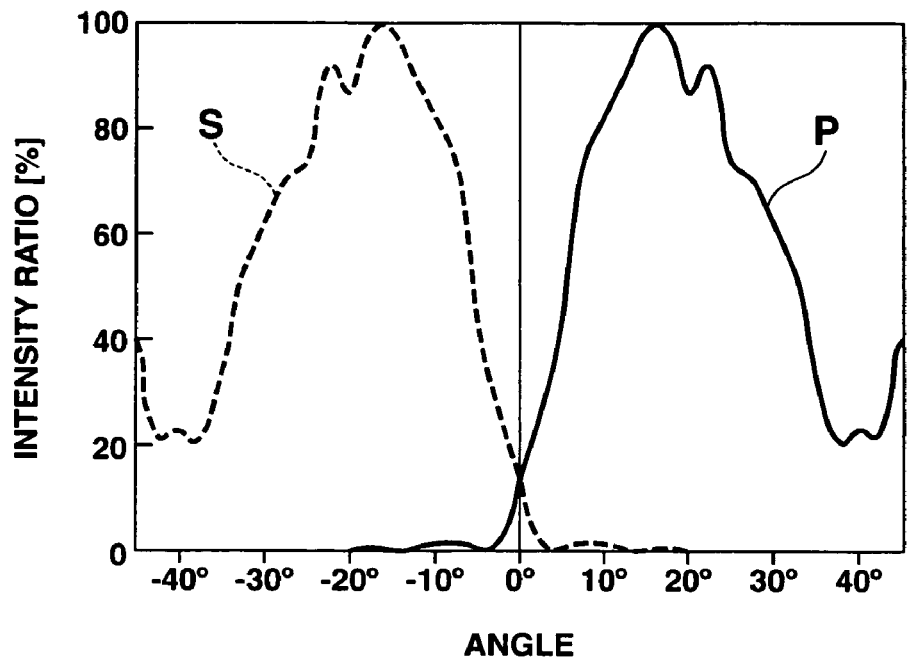
Figure 7:
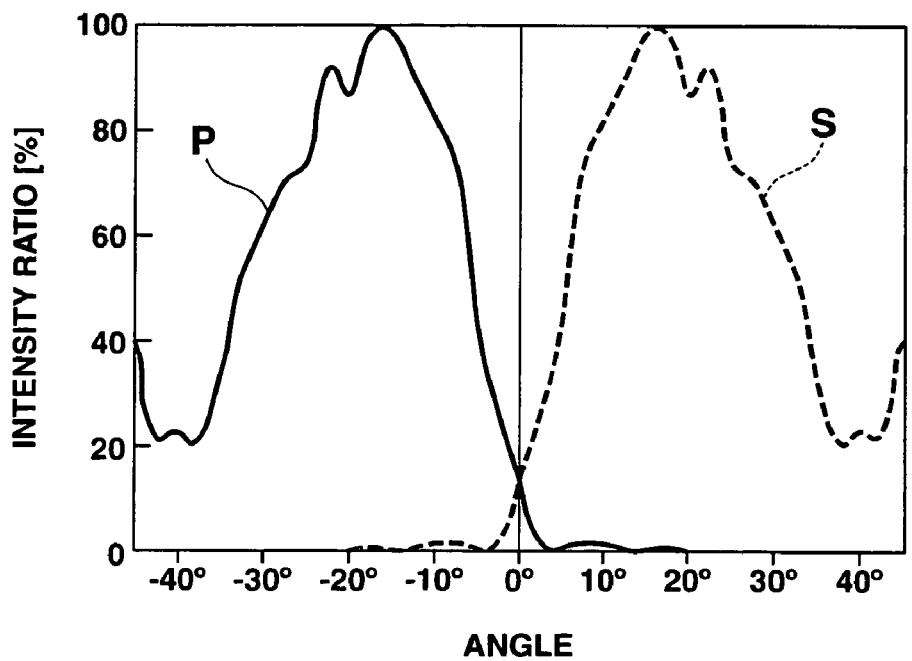

FIG. 6 shows an exiting light intensity distribution of the linear polarized lights P and S in the two directions from the surface light source 7 when the first light emitter 24 is turned on. FIG. 7 illustrates an exiting light intensity distribution of the linear polarized lights P and S in the two directions from the surface light source 7 when the second light emitter 25 is turned on. In FIGS. 6 and 7, a positive angle is an inclined angle in the first exiting direction with respect to the normal line direction (0°) of the exit surface 10 of the light guide plate 8, and a negative angle is an inclined angle in the second exiting direction with respect to the normal line direction (0°).

As described above, the surface light source 7 emits the linear polarized light P as intensive directional light whose exiting light intensity peak exists in the first exiting direction inclined in one direction with respect to the normal line direction of the exit surface 10 of the light guide plate 8, and also emits the linear polarized light S whose polarized plane is substantially perpendicular to that of the linear polarized light P as intensity directional light whose exiting light intensity peak exists in the second exiting direction inclined in the opposite direction of the one direction with respect to the normal line direction of the exit surface 10 of the light guide plate 8 by turning on the first light emitter 24. Further, the surface light source 7 emits the linear polarized light P as intensity directional light whose exiting light intensity peak exists in the second exiting direction, and also emits the linear polarized light S as intensive directional light whose exiting light intensity peak exits in the first exiting direction by turning on the second light emitter 25.

Therefore, the surface light source 7 is arranged on the opposite side of the observation side of the liquid crystal display panel 1 having the polarizing plates 5 and 6 respectively arranged on the observation side and the opposite side, a left-eye image and a right-eye image required to display a three-dimensional image are alternately displayed in the plurality of pixels in the liquid crystal display panel 1, one of the light emitters 24 and 25 of the surface light source 7 is turned on in synchronization with display of the left-eye image, and the other light emitter 25 or 24 is turned on in synchronization with display of the right-eye image, thereby obtaining the liquid crystal display apparatus which displays a three-dimensional image.

In the liquid crystal display apparatus shown in FIGS. 1 and 2, the surface light source 7 is arranged on the opposite side of the observation side of the liquid crystal display panel 1. In this surface light source 7, the lens array 31 is configured to face the liquid crystal display panel 1, and the normal line direction of the exit surface 10 of the light guide plate 8 is matched with the normal line direction of the liquid crystal display panel 1. Furthermore, one of the first and second exiting directions is set to face a direction inclined in a left-eye direction of a display observer with respect to the normal line direction of the liquid crystal display panel 1, and the other exiting direction is set to face a direction inclined in a right-eye direction of the observer with respect to the normal line direction of the liquid crystal display panel 1.

Therefore, the light guide plate 8 of the surface light source 7 allows light with directivity whose exiting light intensity peak exists in the normal line direction of the liquid crystal display panel 1 to exit from the exit surface 10. The lens array 31 of the surface light source 7 allows light transmitted through the $\lambda/2$ retardation portions 29 in the plurality of regions of the retardation element 28 and the linear polarized light P or the linear polarized light S transmitted through the non-retardation portions 30 to exit in the left-eye direction or the right-eye direction of the display observer with respect to the normal line direction of the liquid crystal display panel 1.

Moreover, of the linear polarized light P and the linear polarized light S exiting from the surface light source 7, the linear polarized light having a polarized plane substantially parallel with a direction of the transmission axis 6a of the opposite-side polarizing plate 6 of the liquid crystal display panel 1 enters the liquid crystal display panel 1.

Additionally, the controller 33 for the liquid crystal display panel 1 and the surface light source 7 is constituted of a drive circuit which alternately writes left-eye image data and right-eye image data required to display a three-dimensional image in the plurality of pixels in the liquid crystal display panel 1, turns on the light emitter 25 of the surface light source 7 in synchronization with display of the left-eye image and turns on the light emitter 24 of the surface light source 7 in synchronization with display of the right-eye image.

In the liquid crystal display apparatus according to this embodiment, as shown in FIG. 1, the transmission axis 6a of the opposite-side polarizing plate 6 of the liquid crystal display panel 1 is set in parallel with a lateral direction of the screen, and the transmission axes 26a and 27a of the first and second linear polarizing elements 26 and 27 of the surface light source 7, the phase retardation axis 29a of each of the plurality of $\lambda/2$ retardation portions 29 of the retardation element 28 and the length direction of each lens 32 in the lens array 31 are set as described above. As a result, the linear polarized light P substantially parallel with the transmission axis 6a of the opposite-side polarizing plate 6 of the liquid crystal display panel 1 is allowed to be incident in the right-eye direction from the surface light source 7 by turning on the first light emitter 24, and the linear polarized light P substantially parallel with the transmission axis 6a of the opposite-side polarizing plate 6 is allowed to exit in the left-eye direction from the same by turning on the second light emitter 25. The controller 33 writes left-eye image data in the plurality of pixels of the liquid crystal display panel 1 to display a left-eye image and writes right-eye image data in the same to display a right-eye image in synchronization with lighting of the first and second light emitters 24 and 25.

FIGS. 3A and 3B illustrate the exiting lights when displaying a right-eye image and displaying a left-eye image in the liquid crystal display apparatus, wherein FIG. 3A shows exiting light rays when displaying a right-eye image, and FIG. 3B shows exiting light rays when displaying a left-eye image.

When the first light emitter 24 of the surface light source 7 is turned on, as shown in FIG. 4, the linear polarized light P substantially parallel with the transmission axis 6a of the opposite-side polarizing plate 6 exits from the surface light source 7 in the right-eye direction, and the linear polarized light S substantially perpendicular to the transmission axis 6a of the opposite-side polarizing plate 6 exits from the same in the left-eye direction. Of these linear polarized lights P and S, the linear polarized light P which has exited in the right-eye direction is transmitted through the opposite-side polarizing plate 6 to enter the liquid crystal display panel 1 as indicated by arrows in FIG. 3A, and the linear polarized light S which has exited in the left-eye direction is absorbed into the opposite-side polarizing plate 6.

Therefore, when right-eye image data is written in the plurality of pixels of the liquid crystal display panel 1 and the first light emitter 24 of the surface light source 7 is turned on in synchronization with display of a right-eye image, and image light corresponding to the right-eye image data exits in the right-eye direction of a display observer from the liquid crystal display panel 1. This right-eye image is observed by a right eye of the observer.

Moreover, when the second light emitter 25 of the surface light source 7 is turned on, as shown in FIG. 5, the linear polarized light P substantially parallel with the transmission axis 6a of the opposite-side polarizing plate 6 exits in the left-eye direction from the surface light source 7, and the linear polarized light S substantially perpendicular to the transmission axis 6a of the opposite-side polarizing plate 6 exits in the right-eye direction from the same. Of these linear polarized lights P and S, the linear polarized light P which has exited in the left-eye direction is transmitted through the opposite-side polarizing plate 6 to enter the liquid crystal display panel 1 as indicated by arrows in FIG. 3B, and the linear polarized light S which has exited in the right-eye direction is absorbed into the opposite-side polarizing plate 6 of the liquid crystal display panel 1.

Therefore, when left-eye image data is written in the plurality of pixels of the liquid crystal display panel 1 and the second light emitter 25 of the surface light source 7 is turned on in synchronization with display of a left-eye image, image light corresponding to the left-eye image data exits in the left-eye direction of a display observer from the liquid crystal display panel 1, and a left-eye image is observed by a left eye of the observer.

Since this liquid crystal display apparatus alternately displays a left-eye image and a right-eye image by using all the pixels in the liquid crystal display panel 1 in this manner, resolutions of both the left-eye image and the right-eye image are high, thereby displaying a high-quality three-dimensional image.

Additionally, in this liquid crystal display apparatus, directional light whose exiting light intensity peak exists in the right-eye direction and the left-eye direction and which has a spread angle in a predetermined angle range is allowed to exit from the surface light source 7, thereby displaying a three-dimensional image which has high degrees of luminance and contrast of both the left-eye image and the right-eye image and a higher quality.

The liquid crystal display apparatus may be a field sequential liquid crystal display apparatus in which each of the first and second light emitters 24 and 25 in the surface light source 7 is provided with a red LED, a green LED and a blue LED so that lights of three colors, i.e., red, green and blue selectively exit from these light emitters 24 and 25 without providing color filters in the liquid crystal display panel 1. Alternatively, the liquid crystal display apparatus may have a configuration in which the liquid crystal display panel 1 includes color filters of three colors, i.e., red, green and blue in accordance with each of the plurality of pixels so that white light is emitted from each of the first and second light emitters 24 and 25 in the surface light source 7.

In case of the field sequential liquid crystal display apparatus, the controller 33 selects one set of image data from right-eye image data and right-eye image data having three unit colors, i.e., red, green and blue in an arbitrary order to be sequentially displayed in each pixel in the liquid crystal display panel 1 in accordance with six fields obtained by dividing one frame required to display one three-dimensional color image into six. Further, the controller 33 turns on an LED of a corresponding color in LEDs of three colors, i.e., red, green and blue in the first light emitter 24 of the surface light source 7 in synchronization with display of a right-eye image having each unit color of red, green or blue, and turns on an LED of a corresponding color in LEDs of three colors, i.e., red, green and blue in the second light emitter 25 of the surface light source 7 in synchronization with display of a left-eye image having each unit color of red, green or blue.

In case of the liquid crystal display apparatus provided with colors filters of three colors, i.e., red, green and blue in the liquid crystal display panel 1, the controller 33 writes left-eye image data having color data of three colors, i.e., red, green and blue in each pixel of the liquid crystal display panel 1 to display a left-eye image in one of two fields obtained by dividing one frame required to display one three-dimensional color image into two, and writes right-eye image data having color data of three colors, i.e., red, green and blue in each pixel in the liquid crystal display panel 1 to display a right-eye image in the other of the two fields. Furthermore, the controller 33 is configured to turn on the first light emitter 24 of the surface light source 7 in synchronization with display of the right-eye image and turn on the second light emitter 25 of the surface light source 7 in synchronization with display of the left-eye image data.

Moreover, the light guide unit of the surface light source 7 is not restricted to the light guide plate 8 of the aforementioned construction and it may have another configuration as long as it has an incidence portion from which light enters, an exit surface from which light which has entered from the incidence portion exits and a reflection surface which reflects the light which has entered from the incidence portion toward the exit surface, and guides the light which has entered from the incidence portion to exit from the exit surface.

Figure 8:
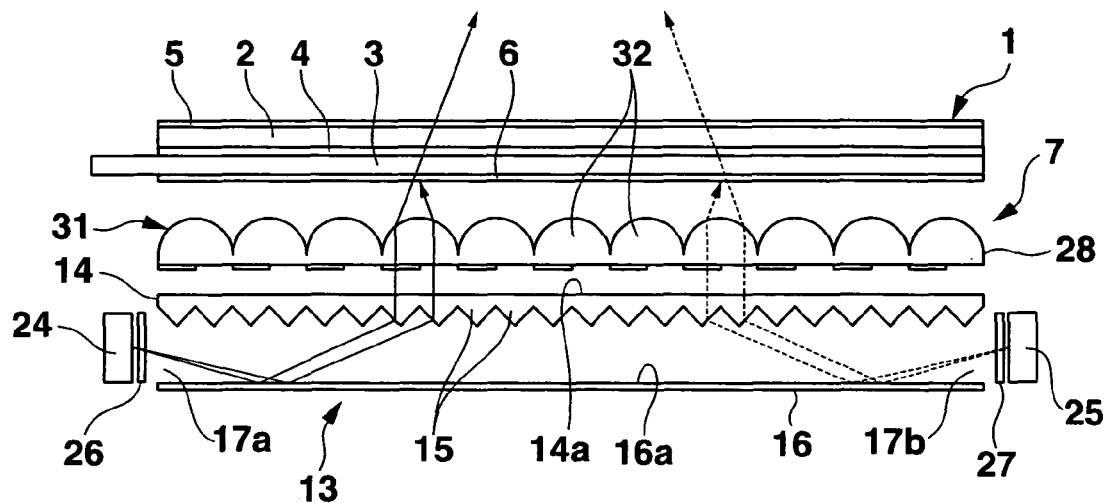
FIG. 8 is a schematic plan view of a liquid crystal display apparatus showing a modification of the first embodiment.

FIG. 8 is a plan view of a liquid crystal display apparatus showing a modification of the first embodiment. This modification has a configuration in which a surface or plane light source 7 is provided with a light guide unit 13 having a prism sheet 14 and a reflection plate 16. In this modification, like reference numerals denote members equal to those in the first embodiment, thereby omitting a description thereof.

In this light guide unit 13, the reflection plate 16 is arranged to face a prism formed surface of the prism sheet 14 having a plurality of elongated prisms 15 formed in parallel on one surface with an elongated narrow space provided between the reflection plate 16 and the prism sheet 14. Incidence portions 17a and 17b from which light enters are provided at opposite end portions of the elongated space between the prism sheet 14 and the reflection plate 16 in a direction perpendicular to a length direction of the elongated prisms 15. An exit surface 14a for light which has entered from the incidence portions 17a and 17b is formed on a surface of the prism sheet 14 opposite to the prism formed surface. A reflection surface 16a which reflects light which has entered from the incidence portions 17a and 17b toward the exit surface 14a is formed on a surface of the reflection plate 16 facing the prism sheet 14.

In this light guide unit 13, light which has entered from the incidence portions 17a and 17b is reflected on the reflection surface 16a of the reflection plate 16 to enter the prism sheet 14. Then this light is refracted by the plurality of elongated prisms 15 on the prism sheet 14 to exit in a normal line direction of the exit surface 14a of the prism sheet 14 from the exit surface 14a as indicated by solid line arrows and broken line arrows in the figure.

Further, in this surface light source 7 according to this embodiment, first and second light emitters 24 and 25 are arranged to respectively face the incidence portions 17a and 17b at the two opposite end portions of the light guide unit 13, and first and second linear polarizing elements 26 and 27 having transmission axes in directions perpendicular to each other are arranged on exit sides of these light emitters 24 and 25. Moreover, the retardation element 28 is arranged to face the exit surface 14a of the light guide unit 13, and the lens array 31 is provided on the opposite side of the side of this retardation element 28 facing the light guide unit 13.

Figure 9:
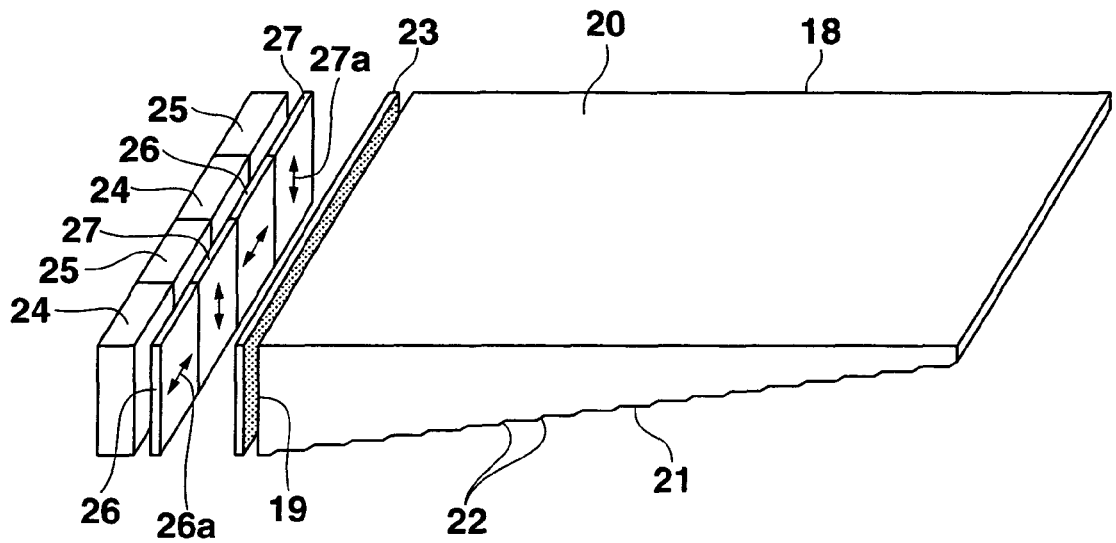
FIG. 9 is a perspective view of a light guide unit, first and second light emitters and first and second linear polarizing elements of a surface light source showing another modification of the first embodiment.

FIG. 9 is a perspective view showing another modification of the light guide unit, the first and second light emitters and the first and second linear polarizing elements in the surface light source in the first embodiment. According to this modification, the light guide unit is constructed by a light guide plate 18 in which incidence portion (which will be referred to as an incidence end surface hereinafter) 19 from which light enters is formed on one end surface of a transparent plate, a flat exit surface 20 from which light which has entered from the incidence end surface 19 exits, is formed on one of two plate surfaces of the transparent plate, and a reflection surface 21 which reflects light which has entered from the incidence portion 19 toward the exit surface 20, is formed on the other plate surface of the transparent plate.

The reflection surface 21 of this light guide plate 18 is formed of an inclined surface inclined in a staircase pattern in a direction to get closer to the exit surface 20 from one end side where the incidence end surface 19 is formed toward the other end side, and a plurality of elongated reflecting portions 22 which internally reflect light which has entered from the incidence end surface 19 in a direction close to a normal line of the exit surface 20 are formed of respective step surfaces of the staircase-like inclined surface.

In the surface light source according to this embodiment, a plurality of (two sets in the figure) first light emitters 24 and a plurality of second light emitters 25 each having a shape obtained by dividing the incidence end surface 19 into an even number along its length direction are alternately aligned in arranged in the length direction of the incidence end surface 19. The first and second linear polarizing elements 26 and 27 are respectively arranged on exit sides of these light emitters 24 and 25 in such a manner that their transmission axes 26a and 27a become substantially perpendicular to each other. Additionally, a diffusion plate 23 which uniforms intensity distributions of linear polarized lights which have exited the first and second light emitters 24 and 25 and then have been transmitted through the first and second linear polarizing elements 26 and 27 to allow the linear polarized lights to enter the light guide plate 18 is arranged between the incidence end surface 19 of the light guide plate 18 and the linear polarizing elements 26 and 27. Although not shown in FIG. 9, like the first embodiment, the retardation element 28 is arranged to face the exit surface 20 of the light guide plate 18, and the lens array 31 is provided on the opposite side of the side of this retardation element 28 facing the light guide plate 18.

Since the surface light source according to each modification shown in FIGS. 8 and 9 has the above-described configuration, like the surface light source 7 according to the first embodiment, one of two linear polarized lights whose polarized planes are substantially perpendicular to each other is allowed to exit in a first exiting direction inclined in one direction with respect to a normal line direction of the exit surface 20 of the light guide plate 18 and the other linear polarized light is allowed to exit in a second exiting direction inclined in an opposite direction of the one direction with respect to the normal line direction of the exit surface 20 of the light guide plate 18 by turning on one of the first and second light emitters 24 and 25. Further, said one linear polarized light is allowed to exit in the second exiting direction and said other linear polarized light is allowed to exit in the first exiting direction by turning on the other light emitter.

Therefore, when the liquid crystal display apparatus having this surface light source arranged on the opposite side of the observation side of the liquid crystal display panel 1 is configured, it is possible to display a high-quality three-dimensional image having high degrees of luminance and contrast of both a left-eye image and a right-eye image.

Second Embodiment

Figure 10:
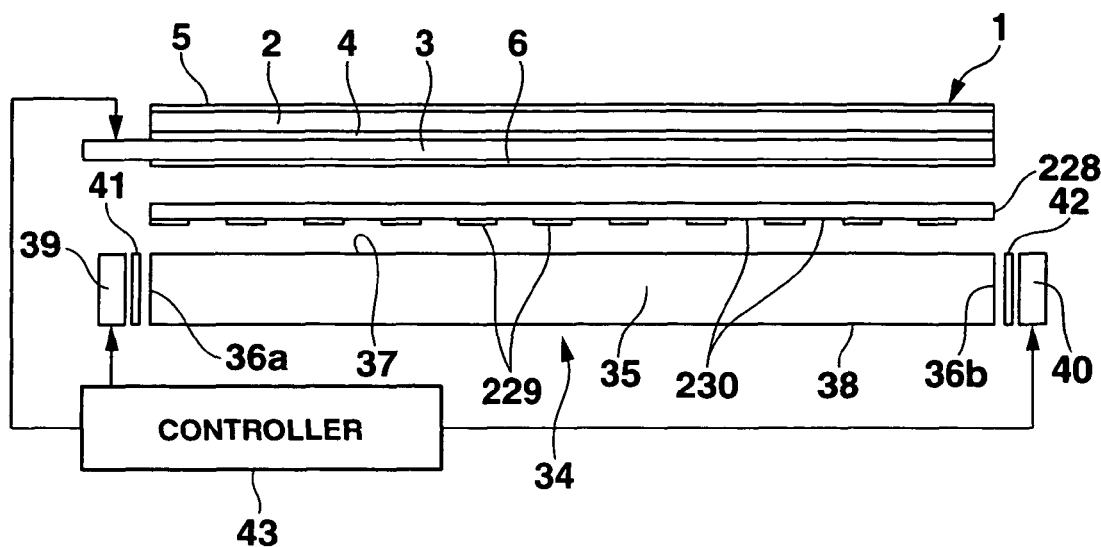
FIG. 10 is a plan view of a liquid crystal display apparatus showing a second embodiment of the present invention.

FIG. 10 is a plan view of a liquid crystal display apparatus showing a second embodiment of the present invention. It is to be noted that, in this embodiment, like reference numerals denote parts corresponding to those in the liquid crystal display apparatus according to the first embodiment, thereby omitting a description thereof.

A liquid crystal display apparatus according to this embodiment is constituted of: the liquid crystal display panel 1; a light source 34 which is arranged on an opposite side of an observation side of the liquid crystal display panel 1 and emits two linear polarized lights having uniform intensity distributions and different polarized planes toward the liquid crystal display panel 1; a retardation element 228 arranged in substantially parallel with the liquid crystal display panel in close proximity to or in contact with the liquid crystal display panel 1 between the light source 34 and the liquid crystal display panel 1; and driving means or a controller 43 for the liquid crystal display panel 1 and the light source 34. The light source 34 selectively applies first illumination light or linear polarized light substantially perpendicular to a transmission axis of an opposite-side polarizing plate 6 of the liquid crystal display panel 1 and second illumination light or linear polarized light substantially parallel with the transmission axis 6a of the opposite-side polarizing plate 6.

The light source 34 is constituted of, e.g., a light guide plate 35 formed of a transparent plate such as an acrylic resin plate having a rectangular planar shape corresponding to a screen area 1a of the liquid crystal display panel 1, first and second light emitters 39 and 40 which are arranged to respectively face two incidence opposite end surfaces 36a and 36b of the light guide plate 35 and selectively turned on, and first and second linear polarizing elements 41 and 42 which are respectively arranged on exit sides of the first and second light emitters 39 and 40 in such a manner that their transmission axes become substantially perpendicular to each other. In the light guide plate 35, the incidence end surfaces 36a and 36b from which light enters are formed on two end surfaces facing each other, an exit surface 37 from which light which has entered from the incidence portions 36a and 36b exits is formed on one of two plate surfaces, and a reflection surface 38 which internally reflects light which has entered from the incidence portions 36a and 36b toward the exit surface 37 is formed on the other plate surface.

Each of the first and second light emitters 39 and 40 is formed of a light-emitting element array in which a plurality of solid light-emitting elements such as LEDs are arranged in a predetermined pattern, and these light emitters are arranged in such a manner that their exit surfaces respectively face one incidence end surface 36a and the other incidence end surface 36b of the light guide plate 35.

Moreover, the first and second linear polarizing elements 41 and 42 are formed into shapes corresponding to the incidence end surfaces 36a and 36b of the light guide plate 35, and arranged between one incidence end surface 36a of the light guide plate 35 and the first light emitter 39 arranged on the outer side thereof and between the other incidence end surface 36b of the light guide plate 35 and the second light emitter 40 arranged on the outer side thereof in such a manner that transmission axes of the respective linear polarizing elements 41 and 42 become substantially perpendicular to each other.

In this embodiment, the first linear polarizing element 41 is arranged in such a manner that its transmission axis becomes substantially parallel with a width direction of the light guide plate 35 (a length direction of the incidence end surfaces 36a and 36b), and the second linear polarizing element 42 is arranged in such a manner that its transmission axis becomes substantially parallel with a board thickness direction of the light guide plate 35 (a height direction of the incidence end surfaces 36a and 36b, i.e., the direction mentioned above).

In this light source 34, the first light emitter 39 and the second light emitter 40 are selectively turned on by the controller 43. Further, first illumination light of linear polarized light parallel with the transmission axis of the first linear polarizing element 41 is allowed to exit from the exit surface 37 of the light guide plate 35 by turning on the first light emitter 39, and second illumination light of linear polarized light parallel with the transmission axis of the second linear polarizing element 42, i.e., linear polarized light substantially perpendicular to the first illumination light is allowed to exit from the exit surface 37 of the light guide plate 35 by turning on the second light emitter 40.

In the retardation element 228, a plurality of $\lambda/2$ retardation portions 229 each of which gives a phase difference of a ½ wavelength between ordinary light and abnormal light of transmitted light are formed in accordance with one or more predetermined pixel columns in a lateral direction of a screen area of the liquid crystal display panel 1, e.g., every other pixel column and a plurality of non-retardation portions 230 having substantially no phase difference are formed in accordance with every other second region. Each of the plurality of $\lambda/2$ retardation portions 229 has a phase retardation axis or slow axis in a direction inclined at substantially 45° with respect to a width direction (a length direction of the incidence end surfaces 36a and 36b) of the light guide plate 35.

That is, the slow axis of each of the plurality of $\lambda/2$ retardation portions 229 crosses, at an angle of substantially 45°, polarized planes of both first illumination light of linear polarized light which is transmitted through the first linear polarizing element 41 from the first light emitter 39 of the light source 34 to enter the light guide plate 35 and exits from the exit surface 37 of the light guide plate 35 and second illumination light of linear polarized light which is transmitted through the second linear polarizing element 42 from the second light emitter 40 to enter the light guide plate 35 and exits from the exit surface 37 of the light guide plate 35.

In this embodiment, the plurality of λ/2 retardation portions 229 and non-retardation portions 230 of the retardation element 228 are arranged every other pixel column in the lateral direction of the screen of the liquid crystal display panel 1. These portions are formed into a vertical stripe pattern along a vertical direction of the screen in accordance with a first region of every other pixel and a second region of remaining every other pixel in the liquid crystal display panel.

That is, the screen area of the liquid crystal display panel is divided into groups in accordance with a predetermined number of, i.e., one or more pixel columns in the lateral direction of the screen, and the plurality of λ/2 retardation portions each of which gives a phase difference of a ½ wavelength between ordinary light and abnormal light of transmitted light are formed in accordance with one group of every other pixel column in these groups whilst the plurality of non-retardation portions having substantially no phase difference are formed in accordance with the other group of every other pixel column. Further, this retardation element is arranged in such a manner that light which travels toward the one group through the plurality of λ/2 retardation portions is allowed to exit toward a direction of one of left and right eyes of an observer, light which travels toward the other group through the plurality of λ/2 retardation portions is allowed to exit toward a direction of the other eye, light which travels toward the one group through the plurality of non-retardation portions is allowed to exit toward the direction of the other eye, and light which travels toward the other group through the plurality of non-retardation portions is allowed to exit toward the direction of the one eye.

In a first display period, the controller 43 writes left-eye image data in image data for a right eye and a left eye required to display a three-dimensional image in each pixel in every other pixel column, e.g., odd-numbered pixel columns in a plurality of pixels in the liquid crystal display panel 1, writes right-eye image data in each pixel in remaining every other pixel column, i.e., even-numbered pixel columns, and emits the first illumination light from the light source 34 in synchronization with display of this right-eye image. Furthermore, in the next second display period, the controller 43 writes the left-eye image data in each pixel in the even-numbered pixel columns and each pixel in the odd-numbered pixel columns, and emits the second illumination light from the light source 34 in synchronization with display of this left-eye image.

That is, right-eye image data and left-eye image data required to display a three-dimensional image are alternately written in each pixel column corresponding to the one group of every other pixel column and each pixel column corresponding to the other group of every other pixel column in the plurality of pixel columns in the liquid crystal display panel. The first illumination light is emitted from the light source in synchronization with display of these images. The left-eye image data and the right-eye image data are alternately written in each pixel column corresponding to the one group of every other pixel column and each pixel column corresponding to the other group of every other pixel column. Then the second illumination light is emitted from the light source in synchronization with display of these images.

This liquid crystal display apparatus may be a field sequential liquid crystal display apparatus or a liquid crystal display apparatus provided with color filters of three colors, i.e., red, green and blue in the liquid crystal display panel 1. In case of the field sequentially liquid crystal display apparatus, the controller 43 is configured in such a manner that left-eye image data and right-eye image data of one of three unit colors, i.e., red, green and blue are written in each odd-numbered pixel column and each even-numbered pixel column in accordance with six fields obtained by dividing one frame required to display one three-dimensional color image into six and the first or second illumination light having a color of the displayed image in three colors, i.e., red, green and blue is emitted from the light source 34 in synchronization with display of each of a left-eye image and a right-eye image of each unit color, i.e., red, green or blue.

Moreover, in case of the liquid crystal display apparatus provided with colors filters of three colors, i.e., red, green and blue in the liquid crystal display panel 1, the controller 43 is configured in such a manner that left-eye image data and right-eye image data of color data of three colors, i.e., red, green and blue are alternately written in the odd-numbered pixel columns and the even-numbered pixel columns in accordance with two fields obtained by dividing one frame required to display one three-dimensional color image into two and first or second white illumination light is emitted from the light source 34 in synchronization with display of images of such data.

Figure 11:
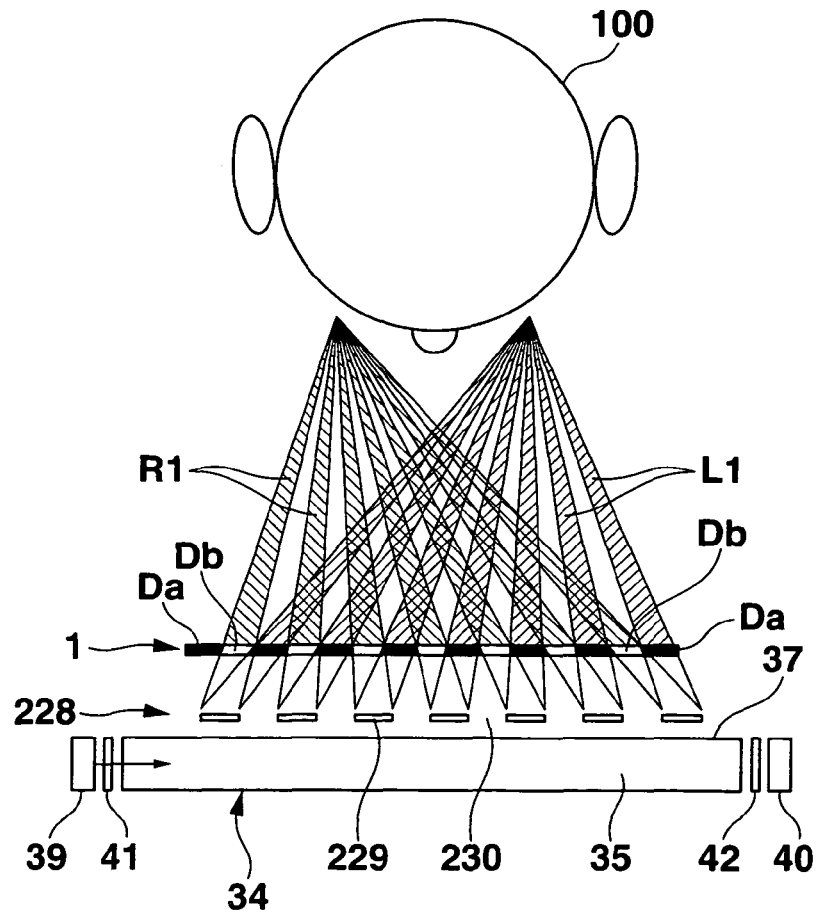
FIG. 11 is a display principle view of a left-eye image and a right-eye image when first illumination light is applied from a light source of the liquid crystal display apparatus according to the second embodiment.
Figure 12:
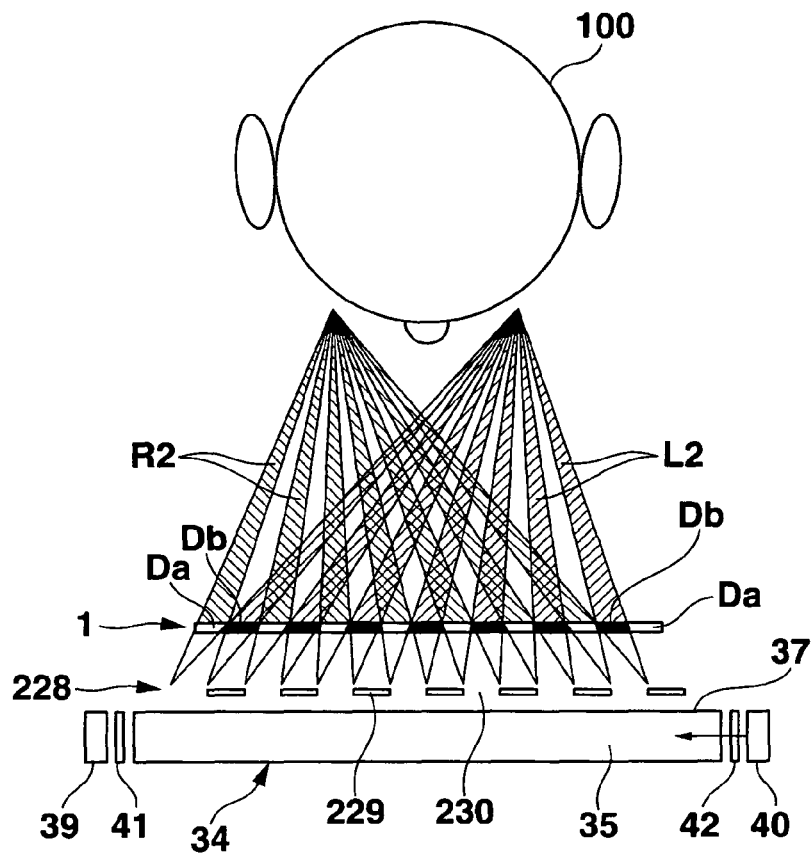
FIG. 12 is a display principle view of a left-eye image and a right-eye image when second illumination light is applied from the light source of the liquid crystal display apparatus according to the second embodiment.

FIGS. 11 and 12 are display principle views of the liquid crystal display apparatus according to the second embodiment, wherein FIG. 11 shows a display principle of a left-eye image and a right-eye image when the first illumination light is emitted from the light source 34, and FIG. 12 shows a display principle of a left-eye image and a right-eye image when the second illumination light is emitted from the light source 34.

This liquid crystal display apparatus writes left-eye image data in odd-numbered pixel columns, writes right-eye image data in even-numbered pixel columns, and emits the first illumination light from the light source 34 in synchronization with display of these images to display a first left-eye image and a first right-eye image every other row in a first display period. In a subsequent second display period, this apparatus writes the left-eye image data in the even-numbered pixel columns, writes the right-eye image data in the odd-numbered pixel columns, and emits the second illumination light from the light source 34 in synchronization with display of these images to display a second left-eye image and a second right-eye image which are images to be displayed between the columns of the first left-eye image and the first right-eye image, thereby displaying a high-definition three-dimensional image based on these four images.

That is, when the first light emitter 39 of the light source 34 emits light, the first illumination light of linear polarized light having a polarized plane substantially perpendicular to the transmission axis 6a of the opposite-side polarizing plate 6 of the liquid crystal display panel 1 is emitted from the exit surface 37 of the light source 34. Of the first illumination light, light transmitted through the plurality of λ/2 retardation portions 229 of the retardation element 228 has a polarized plane rotated 90° and is transmitted through the opposite-side polarizing plate 6, light transmitted through the plurality of non-retardation portions 230 of the retardation element 228 enters the opposite-side polarizing plate 6 without substantially changing its polarized state and is absorbed into the opposite-side polarizing plate 6 of the liquid crystal display panel 1.

Additionally, when the second light emitter 40 of the light source 34 emits light, the second illumination light of linear polarized light having a polarized plane substantially parallel with the transmission axis 6a of the opposite-side polarizing plate 6 of the liquid crystal display panel 1 is emitted from the exit surface 37 of the light source 34. Of the second illumination light, light transmitted through the plurality of non-retardation portions 230 of the retardation element 228 is transmitted through the opposite-side polarizing plate 6 without substantially changing its polarized state, and light transmitted through the plurality of λ/2 retardation portions 229 of the retardation element 228 has the polarized plane rotated 90° and is absorbed into the opposite-side polarizing plate 6 of the liquid crystal display panel 1.

Therefore, first, as shown in FIG. 11, the first left-eye image is displayed in each pixel in the odd-numbered pixel columns whilst the first right-eye image is displayed in each pixel in the even-numbered pixel columns of the liquid crystal display panel 1, and the first light emitter 39 is caused to emit light. At this time, the plurality of λ/2 retardation portions 229 of the retardation element 228 function as slits through which light is transmitted, in other words, the plurality of non-retardation portions 230 function as parallax barriers. That is, light which travels toward the odd-numbered pixel columns (black-colored pixels in FIG. 11) Da from the λ/2 retardation portions 229 proceeds in a left-eye direction of an observer, and a left eye of the observer visually confirms the first left-eye image displayed in the odd-numbered columns. At the same time, light which travels toward the even-numbered pixel columns (outline pixels in FIG. 11) Db adjacent to the odd-numbered pixel columns from the λ/2 retardation portions 229 proceeds in a right-eye direction of the observer 100, and a right eye of the observer 100 visually confirms the first right-eye image displayed in the even-numbered columns.

Then, as shown in FIG. 12, the second right-eye image is displayed in each pixel in the odd-numbered pixel columns, the second left-eye image is displayed in each pixel in the even-numbered pixel columns in the liquid crystal display panel 1, and the second light emitter 40 is caused to emit light. At this time, the plurality of non-retardation portions 230 of the retardation element 228 function as slits through which light is transmitted, in other words, the plurality of λ/2 retardation portions 229 function as parallax barriers. That is, light which travels toward the odd-numbered pixel columns (outline pixels in FIG. 12) Da from the plurality of non-retardation portions 230 proceeds in the right-eye direction of the observer, and the right eye of the observer 100 visually confirms the second right-eye image displayed in the odd-numbered columns. At the same time, light which travels toward the even-numbered pixel columns (black-colored pixels in FIG. 12) Db adjacent to the odd-numbered pixel columns proceeds in the left-eye direction of the observer, and the left eye of the observer visually confirms the second left-eye image displayed in the even-numbered columns.

Figure 13:
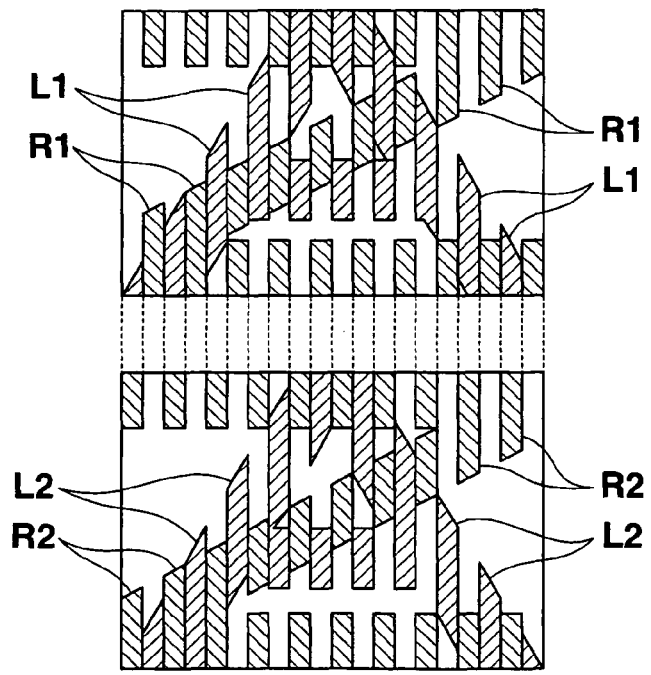
FIG. 13 is a schematic view of a displayed image on a liquid crystal display panel in the liquid crystal display apparatus according to the second embodiment.

FIG. 13 is a schematic view of a display image in the liquid crystal display panel 1 in the liquid crystal display apparatus according to the second embodiment. FIG. 13 shows a left-eye image L1 displayed in the odd-numbered pixel columns and a right-eye image R1 displayed in the even-numbered pixel columns when the first illumination light is emitted from the light source 34 as shown in FIG. 11. Further, this drawing illustrates a left-eye image L2 displayed in the even-numbered pixel columns and a right-eye image R2 displayed in the odd-numbered pixel columns when the second illumination light is emitted from the light source 34 as shown in FIG. 12.

As described above, according to the liquid crystal display apparatus of the present invention, when the first illumination light is emitted from the light source 34, the plurality of non-retardation portions 230 of the retardation element 228 function as parallax barriers, or the plurality of λ/2 retardation portions 229 serve as slits through which light is transmitted, thereby displaying the left-eye image L1 displayed in the odd-numbered pixel columns and the right-eye image R1 displayed in the even-numbered pixel columns. Furthermore, when the second illumination light is emitted from the light source 34, the plurality of λ/2 retardation portions 229 of the retardation element 228 function as the parallax barriers, or the plurality of non-retardation portions 230 serve as slits through which light is transmitted, thereby displaying the left-eye image L2 displayed in the even-numbered pixel columns and the right-eye image R2 displayed in the odd-numbered pixel columns. Based on the left-eye image L1 displayed in the odd-numbered pixel columns and the left-eye image L2 displayed in the even-numbered pixel columns, a left-eye image (a character image A in the display example of FIG. 13) with a high resolution is observed by the left eye of the display observer 100. Moreover, based on the right-eye image R1 displayed in the even-numbered pixel columns and the right-eye image R2 displayed in the odd-numbered pixel columns, a right-eye image (a character image Z in the display example of FIG. 13) with a high resolution can be observed by the right eye of the observer 100.

In this embodiment, although the plurality of λ/2 retardation portions 229 and non-retardation portions 230 of the retardation element 228 are formed in accordance with every other first region and remaining every other second region of the respective regions divided for each pixel column of the liquid crystal display panel 1, the screen area 1a of the liquid crystal display panel 1 may be divided into groups in accordance with a plurality of pixel columns, e.g., approximately 2 to 10 pixel columns in the lateral direction of the screen and the plurality of λ/2 retardation portions 229 and non-retardation portions 230 of the retardation element 228 may be formed in accordance with a first group of every other pixel column and a second group of every other pixel column of the plurality of pixel columns in the liquid crystal display panel 1.

In this manner, the liquid crystal display apparatus according to this embodiment displays the first left-eye image and the second left-eye image by using all the pixels in the liquid crystal display panel 1, and displays the first right-eye image and the second right-eye image by using all the pixels so that these images are observed. Therefore, it is possible to display a high-quality three-dimensional image having high resolutions of both the left-eye image and the right-eye image.

Additionally, the liquid crystal display apparatus according to this embodiment alternately displays the left-eye image and the right-eye image by using the controller 43 in accordance with each pixel in the odd-numbered rows and the even-numbered rows in the liquid crystal display panel 1, thereby displaying a three-dimensional image having a higher quality without flickering.

Third Embodiment

Figure 14:
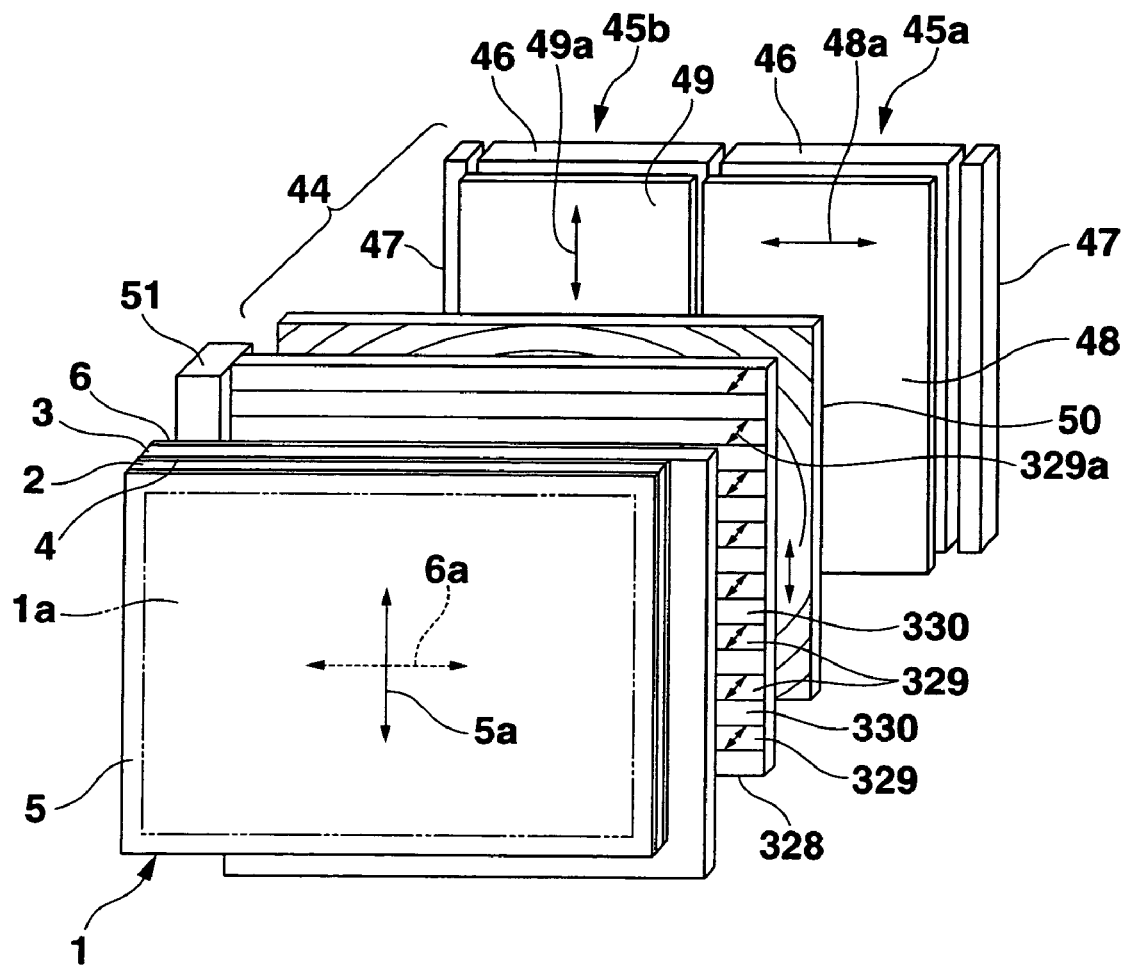
FIG. 14 is a perspective view of a liquid crystal display apparatus showing a third embodiment according to the present invention.
Figure 15:
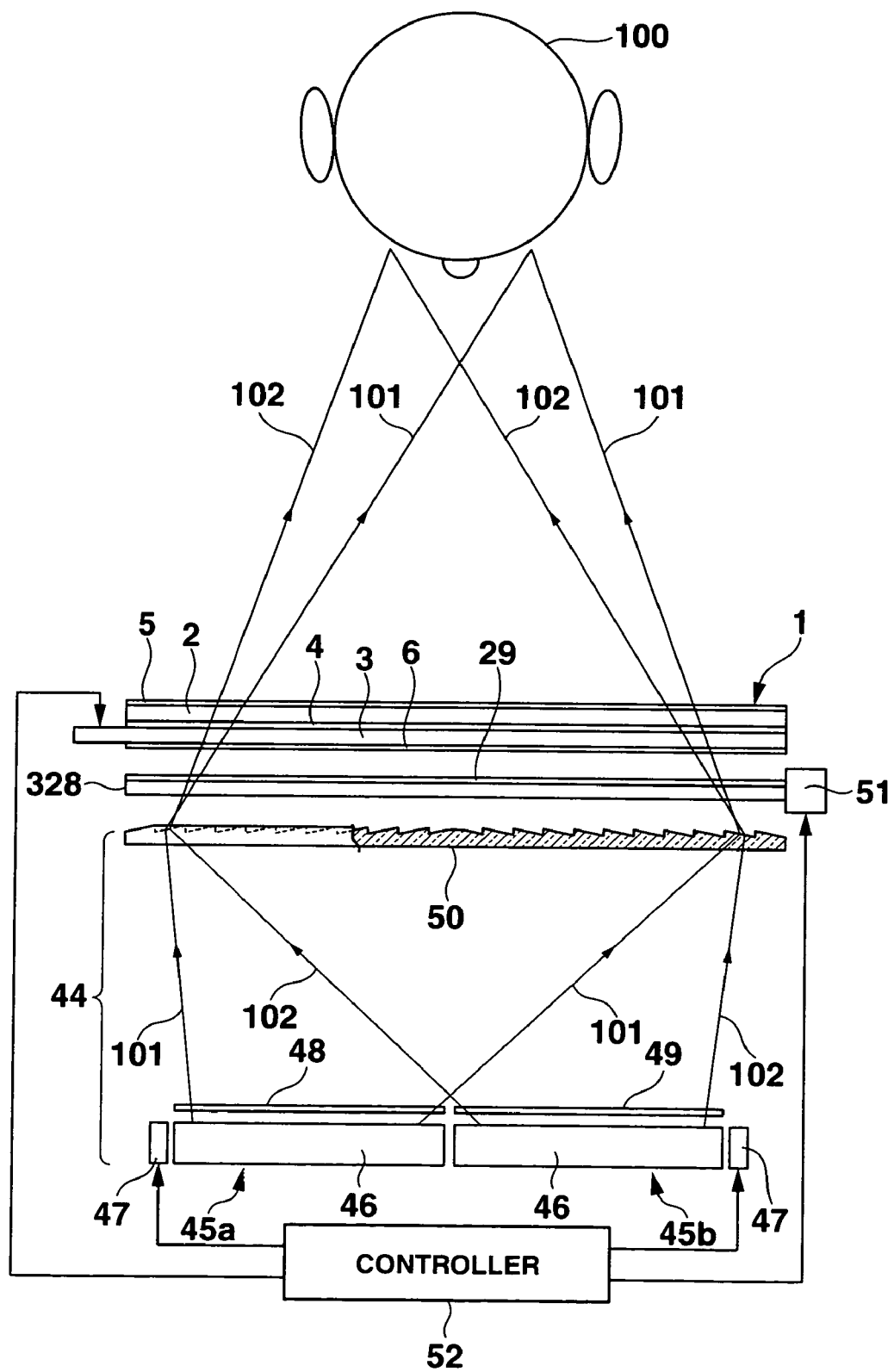
FIG. 15 is a plan view of the liquid crystal display apparatus according to the third embodiment.

FIGS. 14 and 15 are an exploded perspective view and an exploded plan view of a liquid crystal display apparatus showing a third embodiment according to the present invention. It is to be noted that, in this embodiment, like reference numerals denote members equal to those in the liquid crystal display apparatus according to the first embodiment, thereby omitting a description thereof.

A liquid crystal display apparatus according to this embodiment is provided with the liquid crystal display panel 1 and a light source 44. The light source 44 is arranged on an opposite side of an observation side of the liquid crystal display panel 1 and selectively emits toward the liquid crystal display panel 1 first and second illumination lights of linear polarized lights substantially perpendicular to a transmission axis 6a of an opposite-side polarizing plate 6 of the liquid crystal display panel 1. A retardation element 328 is arranged between the light source 44 and the liquid crystal display panel 1 in close proximity to or in contact with the liquid crystal display panel 1 and in substantially parallel with the liquid crystal display panel 1. A retardation element moving member 51 is provided to move the retardation element 328 in a vertical direction of a screen of the liquid crystal display panel 1. A drive portion or a controller 52 is provided for the liquid crystal display panel 1 and the light source 44.

The light source 44 selectively emits first directional illumination light 101 having an exiting light intensity peak in a direction inclined to a direction of one of left and right eyes of a display observer 100 with respect to a normal line direction of the liquid crystal display panel 1 and second directional illumination light 102 which is linear polarized light substantially parallel with the transmission axis 6a of the opposite-side polarizing plate 6 and has an exiting light intensity peak in a direction inclined in a direction of the other eye of the observer 100 with respect to the normal line direction of the liquid crystal display panel 1. This light source 44 is constituted of, e.g., first and second light source portions 45a and 45b respectively corresponding to the right and left half regions of a screen area 1a in the liquid crystal display panel 1, first and second linear polarizing elements 48 and 49 which are respectively arranged on exit sides of the first and second light source portions 45a and 45b in such a manner that their transmission axes 48a and 49b become perpendicular to each other, and a circular Fresnel lens 50 which condenses lights emitted from the first and second light sours portions 45a and 45b in directions of left and right eyes of the observer 100. The circular Fresnel lens 50 condenses the first illumination light 101 which has been emitted from the first light source portion 45a on a right-hand side as seen from the observation side of the liquid crystal display panel 1 and changed into linear polarized light parallel with the transmission axis 48a by the first linear polarizing element 48 in the left-eye direction of the display observer 100. The circular Fresnel lens 50 also condenses the second illumination light 102 which has been emitted from the second light source portion 45b on a left-hand side as seen from the observation side and changed into linear polarized light parallel with the transmission axis 49a by the second linear polarizing element 49 in the direction of the other eye of the observer 100.

In this embodiment, as shown in FIG. 14, the transmission axis 6a of the opposite-side polarizing plate 6 of the liquid crystal display panel 1 is set in parallel with the lateral direction of the screen. The transmission axis 48a of the first linear polarizing element 48 arranged on the exit side of the first light source portion 45a in the light source 44 is set in substantially parallel with the transmission axis 6a of the opposite-side polarizing plate 6 of the liquid crystal display panel 1. Further, the transmission axis 49a of the second linear polarizing element 49 arranged on the exit side of the second light source portion 45b is set to be substantially perpendicular to the transmission axis 6a of the opposite-side polarizing plate 6. In FIG. 14, reference character 5a denotes a transmission axis of an observation-side polarizing plate 5 in the liquid crystal display panel 1.

Each of the first and second light source portions 45a and 45b is constituted of a light guide plate 46, and a light emitter 47. T light guide plate 46 is formed of a transparent plate such as an acrylic resin plate having a rectangular planar shape corresponding to a right half region or a left half region of the screen area in the liquid crystal display panel 1. T light guide plate 46 has an incidence end surface from which light enters formed on one end surface thereof, an exit surface from which light which has entered from the incidence portion exits formed on one of two plate surfaces, and a reflection surface which internally reflects light which has entered from the incidence portion toward the exit surface formed on the other plate surface. T light emitter 47 is arranged to face the incidence end surface of the light guide plate 46. The light emitter 47 is formed of a light-emitting element array in which a plurality of solid light-emitting elements such as LEDs are arranged, and is arranged with its exit surface facing the incidence end surface of the light guide plate 46.

In this light source 44, the light emitter 47 of the first light source portion 45a and the light emitter 47 of the second light source portion 45b are simultaneously turned on by the controller 52 (FIG. 15) to apply toward the liquid crystal display panel 1 the first illumination light of linear polarized light substantially perpendicular to the transmission axis 6a of the opposite-side polarizing plate 6 and has directivity in the direction inclined to the left-eye direction of the display observer 100 with respect to the normal line direction of the liquid crystal display panel 1 and the second illumination light 102 of linear polarized light substantially parallel with the transmission axis 6a of the opposite-side polarizing plate 6 and has directivity in the direction inclined in the direction of the other eye of the observer with respect to the normal line direction of the liquid crystal display panel 1 as indicated by arrow lines in FIG. 15.

In the retardation element 328, a plurality of $\lambda/2$ retardation portions 329 each of which gives a phase difference of a ½ wavelength between ordinary light and abnormal light of transmitted light are formed in accordance with a predetermined number of pixel rows in a screen area 1a of the liquid crystal display panel 1, e.g., every other pixel row in a vertical direction of the screen, and a plurality of non-retardation portions 330 having substantially no phase difference are formed in accordance with remaining every other pixel row. Here, each of the plurality of $\lambda/2$ retardation portions 329 has a phase retardation axis 329a inclined at substantially 45° with respect to the transmission axis 48a of the first linear polarizing element 48 arranged on the exit side of the first light source portion 45a and the transmission axis 49a of the second linear polarizing element 49 arranged on the exit side of the second light source portion 45b in the light source 44.

In this embodiment, the screen area 1a of the liquid crystal display panel 1 is formed into a lateral stripe pattern along a lateral direction of the screen by arranging the plurality of $\lambda/2$ retardation portions 329 and non-retardation portions 330 of the retardation element 328 in accordance with each pixel row of the liquid crystal display panel 1 in a vertical direction of the screen.

Although a configuration of the retardation element moving member 51 is not shown, this member 51 is formed of, e.g., a linear stepping motor and moves the retardation element 328 in the vertical direction of the screen with a stroke corresponding to one pitch of the $\lambda/2$ retardation portions 329 and the non-retardation portions 330 in response to a timing signal supplied from the controller 52 so that the plurality of $\lambda/2$ retardation portions 329 and the non-retardation portions 330 of the retardation element 328 alternately face odd-numbered rows and even-numbered rows in the liquid crystal display panel 1.

When the retardation element moving member 51 allows the $\lambda/2$ retardation portions 329 of the retardation element 328 to face the odd-numbered rows and allows the non-retardation portions 330 to face the even-numbered rows in the liquid crystal display panel 1, the controller 52 simultaneously writes left-eye image data required to display a three-dimensional image in each pixel in the odd-numbered rows in the plurality of pixels in the liquid crystal display panel 1 and writes right-eye image data in each pixel in the even-numbered rows in the same, and simultaneously emits the first and second illumination lights 101 and 102 from the light source 44 in synchronization with display of these images. Further, when the λ/2 retardation portions 329 face the even-numbered rows in the liquid crystal display panel 1 and the non-retardation portions 330 face the odd-numbered rows in the same, the controller 52 simultaneously writes right-eye image data in each pixel in the odd-numbered rows and writes left-eye image data in each pixel in the even-numbered rows, and simultaneously emits the first and second illumination lights 101 and 102 from the light source 44.

The retardation element moving member 51 and the controller 52 alternately perform movement of the retardation element 328, writing of the left-eye image data and the right-eye image data in each pixel in the odd-numbered pixel rows and each pixel in the even-numbered pixel rows in the liquid crystal display panel 1 and writing of the left-eye image data and the right-eye image data in each pixel in the odd-numbered pixel rows and each pixel in the even-numbered pixel rows in the same.

This liquid crystal display apparatus may be a field sequential liquid crystal display apparatus or a liquid crystal display apparatus including color filters of three colors, i.e., red, green and blue in the liquid crystal display panel 1. In this case, the retardation element moving member 51 and the controller 52 move the retardation element 328 in one of upper and lower directions in accordance with six fields obtained by dividing one frame required to display one three-dimensional color image into six, simultaneously write left-eye image data and right-eye image data having one of three unit colors, i.e., red, green and blue in each pixel in the odd-numbered pixel rows and each pixel in the even-numbered pixel rows, and emit the first and second illumination lights 101 and 102 corresponding to an image color in three colors, i.e., red green and blue from the light source 44 in synchronization with display of a left-eye image and a right-eye image having each unit color of red, green or blue.

Moreover, in case of the liquid crystal display apparatus including color filters of three colors, i.e., red, green and blue in the liquid crystal display panel 1, the retardation element moving member 51 and the controller 52 move the retardation element 328 in one of upper and lower directions in accordance with two fields obtained by dividing one frame required to display one three-dimensional color image into two, alternately write left-eye image data and right-eye image data of color data having three colors, i.e., red, green and blue in the odd-numbered pixel rows and the even-numbered pixel rows to display respective images, and emit first and second white illumination lights 101 and 102 from the light source in synchronization with display of these images.

In this liquid crystal display apparatus, of the first illumination light 101 emitted from the first light source portion 45a in the light source 44, light transmitted through the plurality of λ/2 retardation portions 329 of the retardation element 328 has a polarized plane rotated 90° and is transmitted through the opposite-side polarizing plate 6 of the liquid crystal display panel 1, and light transmitted through the plurality of non-retardation portions 330 of the retardation element 328 travels without substantially changing its polarized state and is absorbed into the opposite-side polarizing plate 6.

Further, of the second illumination light 102 emitted from the second light source portion 45b of the light source 44, light transmitted through the plurality of non-retardation portions 330 of the retardation element 328 travels without substantially changing its polarized state and is transmitted through the opposite-side polarizing plate 6 of the liquid crystal display panel 1, and light transmitted through the plurality of λ/2 retardation portions 329 of the retardation element 328 has a polarized plane rotated 90° and is absorbed into the opposite-side polarizing plate 6.

The λ/2 retardation portions 329 of the retardation element 328 are caused to face the odd-numbered pixel rows whilst the non-retardation portions 330 of the same are caused to face the even-numbered pixel rows in the liquid crystal display panel 1, a left-eye image is displayed in the odd-numbered pixel rows whilst a right-eye image is displayed in the even-numbered pixel rows in the liquid crystal display panel 1, and the first and second illumination lights 101 and 102 are emitted from the light source 44 in synchronization with display of these images. At this time, a left eye of the observer 100 observes the left-eye image displayed in the odd-numbered pixel rows, and a right eye of the observer 100 observes the right-eye image displayed in the even-numbered pixel rows.

Additionally, the λ/2 retardation portions 329 of the retardation element 328 are caused to face the even-numbered pixel rows whilst the non-retardation portions 330 of the same are caused to face the odd-numbered pixel rows in the liquid crystal display panel 1, the left-eye image is displayed in the even-numbered pixel rows whilst the right-eye image is displayed in the odd-numbered pixel rows in the liquid crystal display panel 1, and the first and second illumination lights 101 and 102 are emitted from the light source 44 in synchronization with display of these images. At this time, the left eye of the observer 100 observes the left-eye image displayed in each pixel in the even-numbered pixel rows, and the right eye of the observer 100 observes the right-eye image displayed in each pixel in the odd-numbered pixel rows.

Therefore, according to this liquid crystal display apparatus, the left-eye image with a high resolution of the two left-eye images alternately displayed in every other pixel rows, i.e., the odd-numbered pixel rows and the even-numbered pixel rows in the liquid crystal display panel 1 can be observed by the left eye of the display observer 100, and the right-eye image with a high resolution of the two right-eye images alternately displayed in the even-numbered pixel rows and the odd-numbered pixel rows in the liquid crystal display panel 1 can be observed by the left eye of the display observer 100.

It is to be noted that the plurality of λ/2 retardation portions 329 and non-retardation portions 330 of the retardation element 328 are formed in accordance with every other pixel row in the liquid crystal display panel 1 in this embodiment, but groups each having of a plurality of pixel rows, e.g., approximately 2 to 10 pixel rows may be formed in the screen area 1a of the liquid crystal display panel 1 in the vertical direction of the screen and the plurality of λ/2 retardation portions 329 and non-retardation portions 330 of the retardation element 328 may be respectively formed in accordance with each group of every other pixel row in the liquid crystal display panel 1.

Fourth Embodiment

Figure 16:
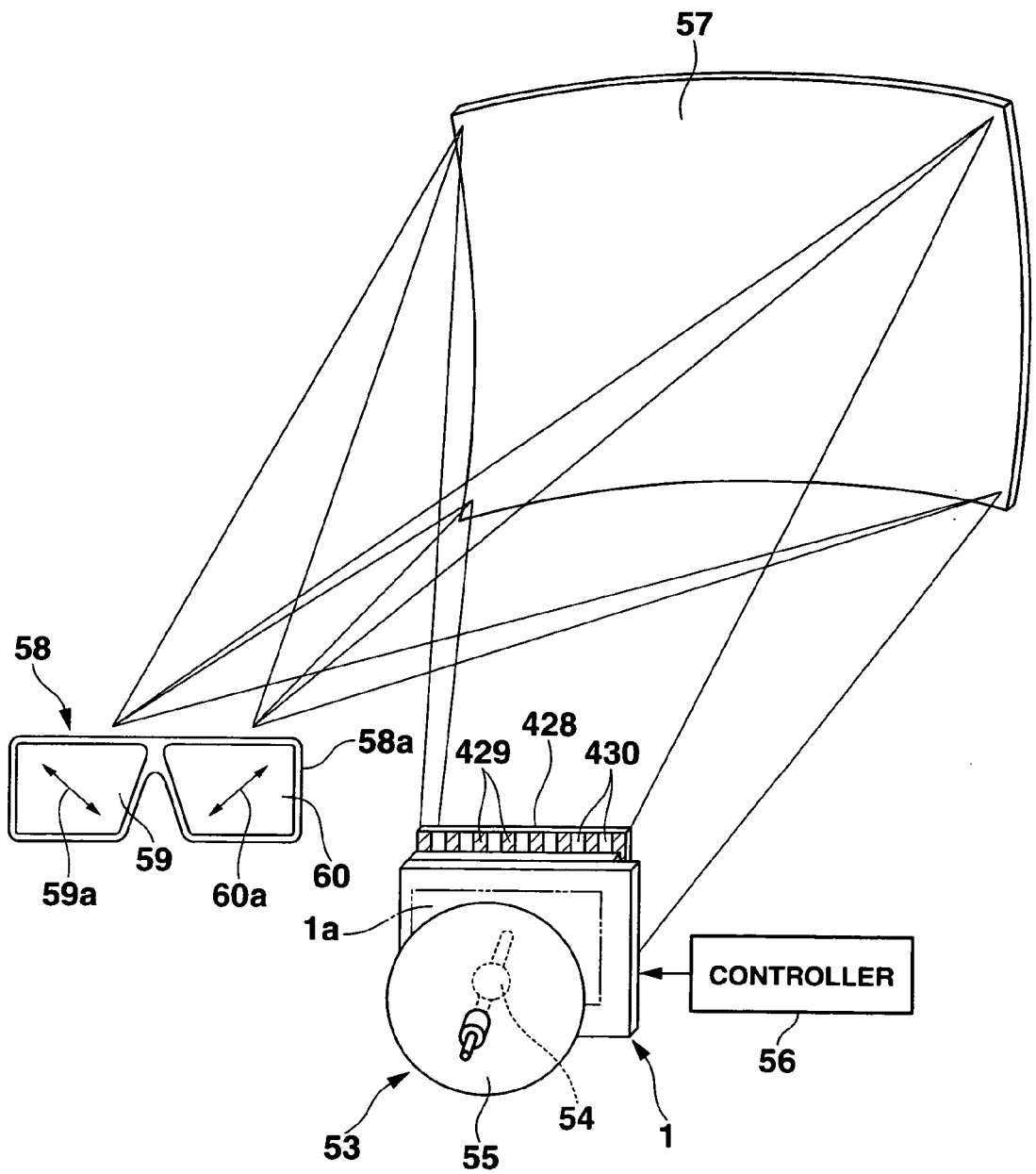
FIG. 16 is a perspective view of a liquid crystal display apparatus showing a fourth embodiment according to the present invention.

FIG. 16 is a perspective view of a liquid crystal display apparatus showing a fourth embodiment according to the present invention. In this embodiment, like reference numerals denote members equal to those in the liquid crystal display apparatus according to the first embodiment, thereby omitting a description thereof.

A liquid crystal display apparatus according to this embodiment is provided with: the liquid crystal display panel 1; a light source 53 which is arranged on an opposite side of an observation side of the liquid crystal display panel 1 and emits illumination light toward the liquid crystal display panel 1; a retardation element 428 which is arranged on the observation side of the liquid crystal display panel 1 in close proximity to or in contact with the liquid crystal display panel 1 and in substantially parallel with the liquid crystal display panel 1; a drive portion or a controller 56 for the liquid crystal display panel 1; a reflection type screen 57 which reflects in a direction of a display observer image light exiting from the liquid crystal display panel 1 toward the observation side; and a pair of observation polarized glasses which is used by the observer to observe a three-dimensional image.

The light source 53 is constituted of a light source lamp 54 and a reflector 55 which reflects irradiation light from the light source lamp 54 toward the liquid crystal display panel 1. The reflection type screen 57 is formed of a concave curved screen which compensates a skew of a displayed image caused due to spread of the irradiation light from the light source 53.

In the retardation element 428, a plurality of $\lambda/2$ retardation portions 429 each of which gives a phase difference of a ½ wavelength between ordinary light and abnormal light of transmitted light are formed in accordance with every other pixel column in a screen area 1a of the liquid crystal display panel 1, and a plurality of non-retardation portions 430 having substantially no phase difference are formed in accordance with remaining every other pixel column in the same. Each of the plurality of $\lambda/2$ retardation portions 429 has a phase retardation axis in a direction inclined at substantially 45° with respect to the transmission axis of the observation-side polarizing plate of the liquid crystal plane 1, and formed into vertical stripe patterns along a vertical direction of the screen.

The controller 56 of the liquid crystal display panel 1 is formed of a write drive circuit which writes image data for one eye in right-eye image data and left-eye image data required to display a three-dimensional image in each pixel in every other pixel column corresponding to the plurality of $\lambda/2$ retardation portions 429 of the retardation element 428 in the plurality of pixels of the liquid crystal display panel 1, and writes image data for the other eye in each pixel in remaining every other pixel column corresponding to the plurality of non-retardation portions 430 of the retardation element 428.

Left-eye and right-eye linear polarizing elements 59 and 60 of the observation polarized glasses 58 are fixed in a glasses frame 58a in such a manner that transmission axes 59a and 60a of the respective linear polarizing elements 59 and 60 become substantially perpendicular to each other.

According to the liquid crystal display apparatus of this embodiment, the light source 53 which emits illumination light toward the liquid crystal display panel 1 is arranged on the opposite side of the observation side of the liquid crystal display panel 1, and the retardation element 42 having the plurality of $\lambda/2$ retardation portions 429 and the plurality of non-retardation portions 430 is arranged on the observation side of the liquid crystal display panel 1. The plurality of $\lambda/2$ retardation portions 429 are formed in accordance with every other pixel column in the screen area 1a of the liquid crystal display panel 1 in the lateral direction of the screen. The plurality of non-retardation portions 430 are formed in accordance with remaining every other pixel column. Further, the controller 56 writes and displays image data for one eye of right-eye and left-eye image data in each pixel corresponding to the plurality of $\lambda/2$ retardation portions 429 of the retardation element 428 in the plurality of pixels of the liquid crystal display panel 1, and writes and displays image data for the other eye in each pixel corresponding to the plurality of non-retardation portions 430 of the retardation element 428. The thus displayed images are observed by the observation polarized glasses 58 having the left-eye linear polarizing element 59 which allows transmission of light which has been transmitted through either the plurality of $\lambda/2$ retardation portions 429 or the plurality of non-retardation portions 430 of the retardation element 428 to exit toward the observation side and the right-eye linear polarizing element 60 which allows transmission of light which has been transmitted through the other to exit toward the observation side.

According to this liquid crystal display apparatus, an image for one eye displayed in regions corresponding to the plurality of $\lambda/2$ retardation portions 429 of the retardation element 428 in the screen area 1a of the liquid crystal panel 1 and image data for the other eye displayed in regions corresponding to the plurality of non-retardation portions 430 of the retardation element 428 in the same can be respectively observed by left and right eyes of a display observer 100, thereby displaying a three-dimensional image.

It is to be noted that the liquid crystal display apparatus according to this embodiment is provided with the reflection type screen 57 which reflects toward the display observer image light which has exited toward the observation side from the liquid crystal display panel 1, but the reflection type screen 57 may be changed to a transmission type screen so that image lights for left and right eyes transmitted through this transmission type screen can be observed by the observation polarized glasses 58. Alternatively, image lights for left and right eyes which have exited toward the observation side from the liquid crystal display panel 1 may be directly observed by the observation polarized glasses 58 without changing the screen.

Other Embodiments

Although the plurality of $\lambda/2$ retardation portions 29, 229, 329 or 429 and non-retardation portions 30, 230, 330 or 430 of the retardation element 28, 228, 328 or 428 are formed into the stripe patterns along the vertical direction or the lateral direction of the screen of the liquid crystal display panel 1 in each of the foregoing embodiments, the plurality of $\lambda/2$ retardation portions 29, 229, 329 or 429 and non-retardation portions 30, 230, 330 or 430 of the retardation element 28, 228, 328 or 428 may be formed into, e.g., checker board patterns in which these portions are alternately aligned in the vertical direction and the lateral direction of the screen. Moreover, in case of forming the plurality of $\lambda/2$ retardation portions 29 and non-retardation portions 30 of the retardation element 28 into the checker board patterns in the first embodiment, it is good enough to likewise form each lens 32 in the lens array 31 into a checker board pattern corresponding to the $\lambda/2$ retardation portions 29 and the non-retardation portions 30.

Additionally, although the liquid crystal display apparatus in each of the foregoing embodiments is provided with the TN type liquid crystal display panel 1, the liquid crystal display panel may be an STN type, a non-twisted horizontal alignment type, a vertical alignment type or a bent alignment type liquid crystal display panel, or a ferroelectric or antiferroelectric liquid crystal display panel, or others.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A liquid crystal display apparatus comprising:
   a liquid crystal display panel which includes a first polarizing plate, and in which a plurality of pixels are arranged in a matrix form;
   a surface light source which includes (i) a light guide unit having first and second end surfaces which are opposite each other, (ii) a first light source, which faces the first end surface, for emitting a first light to the first end surface, (iii) a first linear polarization element which is positioned between the first light source and the first end surface and which has a first transmission axis extending in a first direction, (iv) a second light source, which faces the second end surface, for emitting a second light to the second end surface, and (v) a second linear polarization element which is positioned between the second light source and the second end surface and which has a second transmission axis normal to the first transmission axis;
   a retardation element which is arranged between the first polarizing plate and the surface light source, and which includes a plurality of retardation strip portions and non-retardation strip portions, wherein the retardation strip portions and the non-retardation strip portions are extended in a first direction, and are alternately arranged in a second direction normal to the first direction with a pitch corresponding to a pitch of the pixels, and wherein the retardation strip portions rotate a polarized plane of incident light by 90° to emit a polarized light to the first polarizing plate;
   a light source driving unit configured to control the surface light source to alternately emit the first light which has been polarized in a direction normal to a transmission axis of the first polarizing plate by the first linear polarization element and the second light which has been polarized in a direction parallel with the transmission axis of the first polarizing plate by the second linear polarization element in a time divisional manner; and
   a panel driving unit configured (i) to perform control to display part of a left-eye image on a first row of pixels of the liquid crystal display panel and to perform control to display part of a right-eye image on a second row of pixels adjacent to the first row of pixels, when the surface light source emits the first light and does not emit the second light, and (ii) to perform control to display part of a right-eye image on the first row of pixels of the liquid crystal display panel and to perform control to display part of a left-eye image on the second row of pixels adjacent to the first row of pixels, when the surface light source emits the second light and does not emit the first light.

2. The liquid crystal display apparatus according to claim 1, wherein one of (i) each of the retardation strip portions of the retardation element, and (ii) each of the non-retardation strip portions of the retardation element functions as a parallax barrier, when the surface light source emits the first light and does not emit the second light, and
   wherein the other of (i) each of the retardation strip portions of the retardation element and (ii) each of the non-retardation strip portions of the retardation element functions as a parallax barrier, when the surface light source emits the second light and does not emit the first light.

3. The liquid crystal display apparatus according to claim 1, wherein the retardation strip portions are arranged to respectively correspond to first rows of a plurality of rows of the pixels, each of the retardation strip portions comprising a $\lambda/2$ retardation portion which gives a phase difference of a ½ wavelength between ordinary light and abnormal light of transmitted light, and a delay axis of the retardation strip portion being inclined with respect to the transmission axis of the first polarizing plate at an angle of 45°;
   wherein the non-retardation strip portions are arranged to respectively correspond to second rows of the plurality of rows of the pixels; and
   wherein the first rows of the pixels and the second rows of the pixels are alternately arranged in a column direction of the pixels.

4. The liquid crystal display apparatus according to claim 3, wherein each of the first rows of the pixels is one of an odd-numbered row and an even-numbered row of the plurality of rows of the pixels, and each of the second rows of the pixels is the other of an odd-numbered row and an even-numbered row of the plurality of rows of the pixels.

5. The liquid crystal display apparatus according to claim 4, wherein when the surface light source emits the first light and does not emit the second light, a left-eye image is displayed on one of (i) each of the odd-numbered rows of the pixels and (ii) each of the even-numbered rows of the pixels, and a right-eye image is displayed on the other of (i) each of the odd-numbered rows of the pixels and (ii) each of the even-numbered rows of the pixels, and one of the retardation strip portions and the non-retardation strip portions acts as a parallax barrier, such that the left-eye image is viewed by a left eye of an observer and the right-eye image is viewed by a right eye of the observer; and
   wherein when the surface light source emits the second light and does not emit the first light, the right-eye image is displayed on one of (i) each of the odd-numbered rows of the pixels and (ii) each of the even-numbered rows of the pixels, and the left-eye image is displayed on the other of (i) each of the odd-numbered rows of the pixels and (ii) each of the even-numbered rows of the pixels, and one of the retardation strip portions and the non-retardation strip portions acts as a parallax barrier, such that the right-eye image is viewed by the right eye of the observer and the left-eye image is viewed by the left eye of the observer.

* * * * *